United States Patent [19]

Magata et al.

[11] 4,219,852
[45] Aug. 26, 1980

[54] IMPROVED CASSETTE RECORDER HAVING SIMPLIFIED OPERATION

[75] Inventors: Yoshihiro Magata, Kawagoe; Kobun Yoshida, Kamifukuoka; Itsuo Kato, Sayama, all of Japan

[73] Assignee: Pioneer Electronic Corporation, Tokyo, Japan

[21] Appl. No.: 954,881

[22] Filed: Oct. 26, 1978

[30] Foreign Application Priority Data

Oct. 28, 1977 [JP] Japan .................................. 52-129350

[51] Int. Cl.² .......................... G11B 5/54; G11B 15/24
[52] U.S. Cl. ...................................... 360/90; 360/105
[58] Field of Search ...................... 360/96, 90, 94, 75, 360/105; 242/197–200

[56] References Cited

U.S. PATENT DOCUMENTS

| | | | |
|---|---|---|---|
| 3,921,216 | 11/1975 | Wada | 360/93 X |
| 4,071,861 | 1/1978 | Hirose | 360/105 X |
| 4,131,922 | 12/1978 | Yoshida et al. | 360/90 |

*Primary Examiner*—John H. Wolff
*Attorney, Agent, or Firm*—Armstrong, Nikaido, Marmelstein & Kubovcik

[57] ABSTRACT

An improved cassette tape recorder is disclosed in which a cam disc is used to move a head carriage between intermediate and recording/playback positions. When a playback, record or stop lever is pushed, a solenoid is energized to displace a lock arm to disengage the lock arm from a toothed cam plate integral with the cam disc, thus allowing the cam disc to rotate a half turn. A set plate for controlling pinch roller and take-up units is also operatively connected to the cam disc. The pinch roller is brought into contact with a capstan and a rotating shaft of the take-up unit is brought into engagement with a take-up base at the same time when the head carriage is shifted from the intermediate to the recording/playback position in response to the half turn of the cam disc. A lever arm connects the playback lever and the set plate so that the playback lever is moved into the playback position when the set plate is in contact with the smallest lobe of the cam disc, that is, during the recording operation.

15 Claims, 34 Drawing Figures

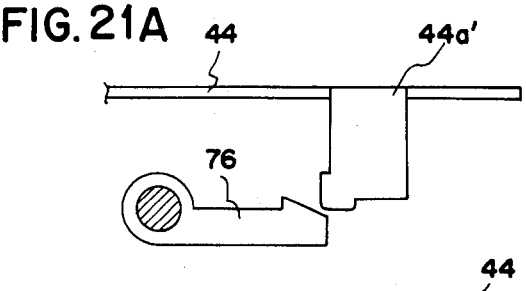
FIG. 21A
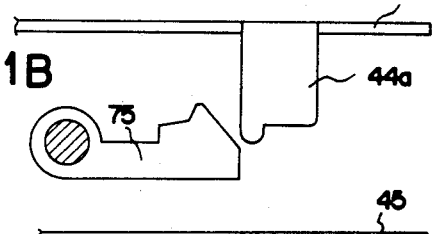
FIG. 21B
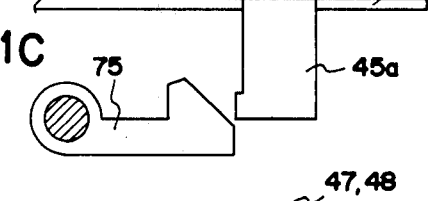
FIG. 21C
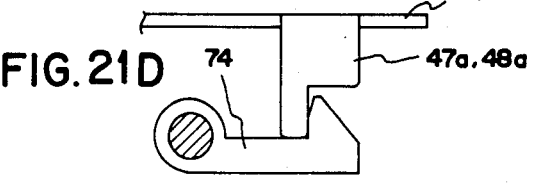
FIG. 21D
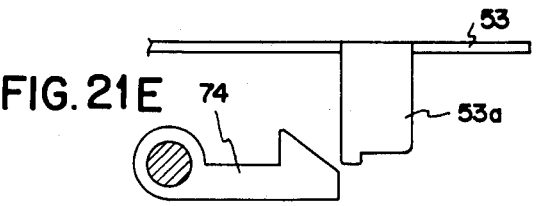
FIG. 21E
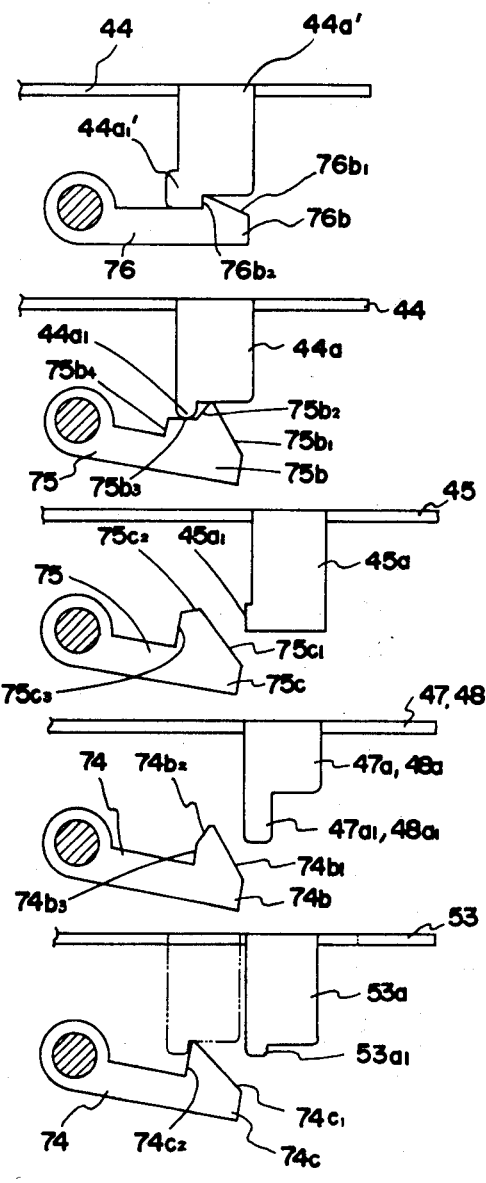

IMPROVED CASSETTE RECORDER HAVING SIMPLIFIED OPERATION

BACKGROUND OF THE INVENTION

This invention relates to a mechanism for a cassette tape recorder.

It is an object of this invention to provide a drive mechanism for a tape recorder in which a cam disc for controlling the location of a head carriage between a rest or optionally intermediate position and a recording/playback position is turned by pushing any one of playback, record and stop levers to actuate drive means for controlling the cam disc.

It is another object of this invention to provide a drive mechanism for a tape recorder in which a gear or cam disc for controlling the location of pinch roller and take-up units is turned by pushing any one of playback, record and stop levers to actuate drive means for controlling the cam disc.

It is a further object of this invention to provide a drive mechanism for a tape recorder in which the recording operation can be achieved by pushing only a record lever.

BRIEF DESCRIPTION OF THE DRAWINGS

The objects, features and advantages of the invention will become more apparent by referring to the following description and appended drawings in which:

FIGS. 21A to 21E are schematic side views showing the relation of the individual levers and associated lock plates, respectively;

DESCRIPTION OF THE PREFERRED EMBODIMENTS

Figure 1:
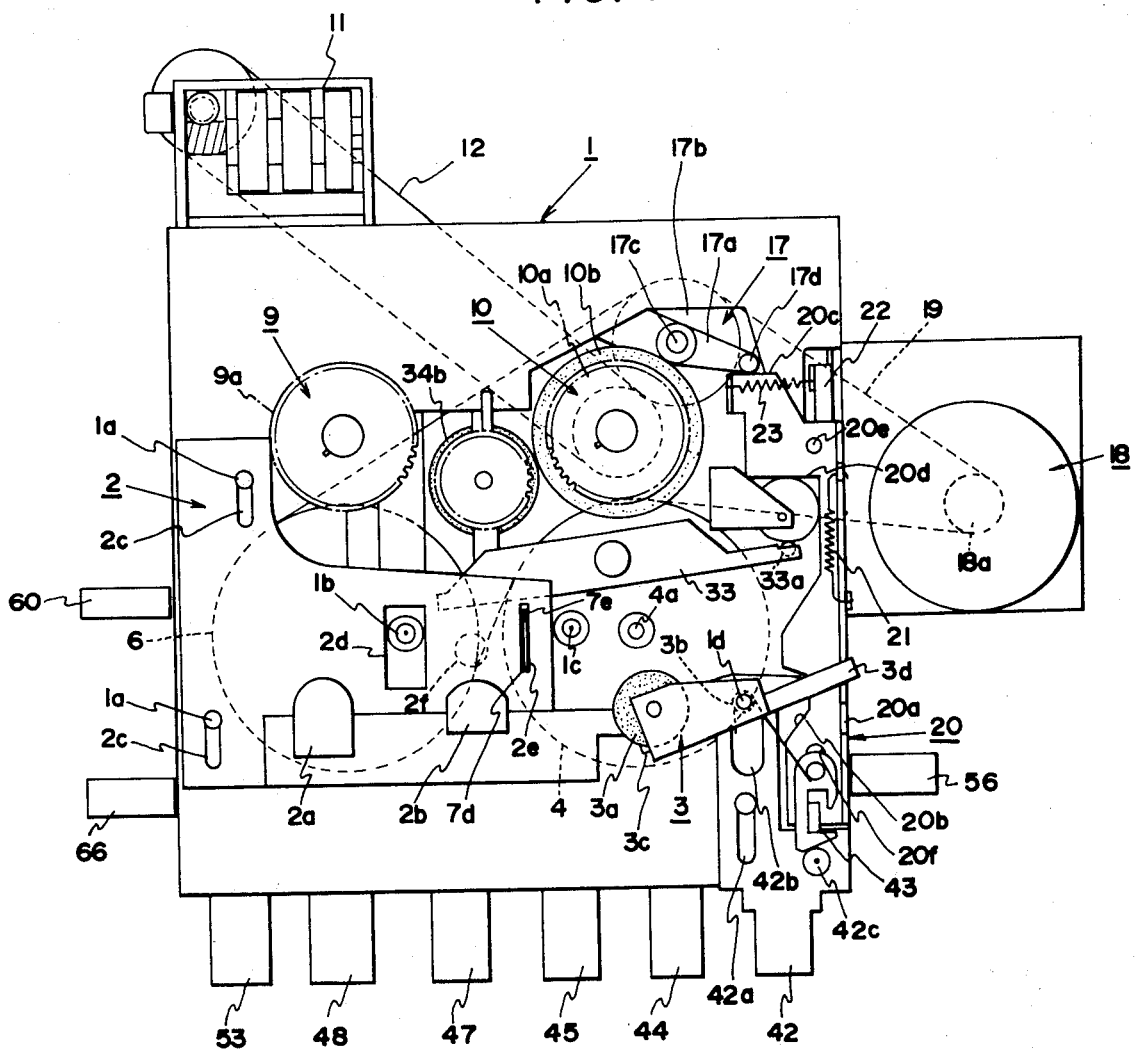
FIG. 1 is plan view of a tape recorder having a drive mechanism incorporated therein according to the present invention.
Figure 2:
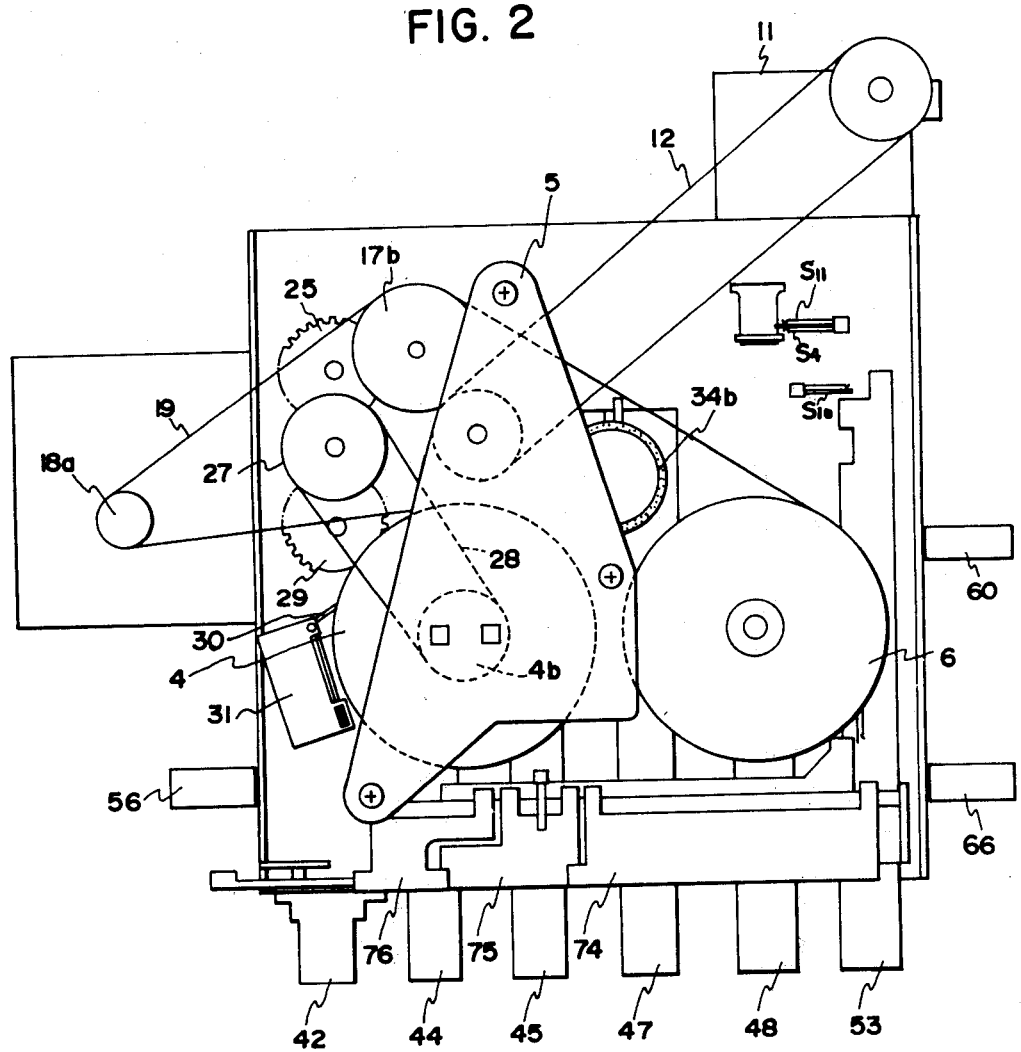
FIG. 2 is a bottom view of the tape recorder.
Figure 3:
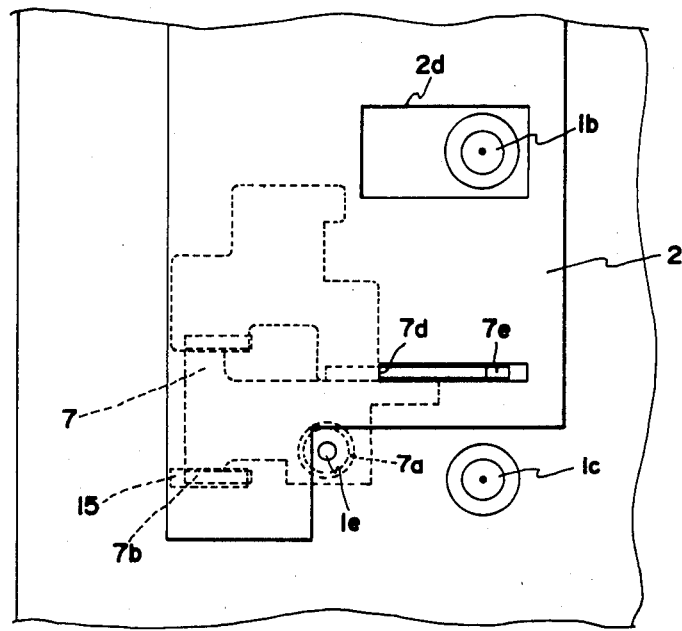
FIG. 3 is a plan view of a mechanism for locking a head carriage.
Figure 4:
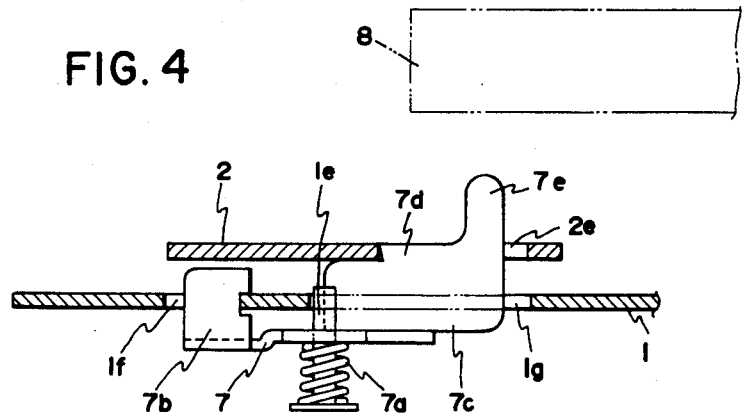
FIG. 4 is a cross-sectional view of the locking mechanism of FIG. 3.

Referring to FIG. 1, the tape recorder of the present invention comprises a chassis 1 on which a head carriage 2 having erase and recording playback heads 2a and 2b is slidably mounted. Chassis 1 has guide pins 1a and a stopper 1b (which also serves to align the cassette as described hereinafter) fixed perpendicular to the surface thereof and head carriage 2 has guide slots 2c for receiving guide pins 1a and another slot 2d for receiving stopper 1b. Chassis 1 also has another pin 1c for aligning the cassette in cooperation with stopper 1b. This pin and slot arrangement allows carriage 2 to be moved forward and backward on chassis 1. Carriage 2 also has a lock slot 2e formed therein which is associated with an upstanding wall 7c of a locking member 7 to be described hereinafter. On a support pin 1d anchored in chassis 1 is rotatably mounted a pinch roller unit 3 which has a pinch roller 3a and is biased toward a capstan 4a by the action of a spring 3b. Roller unit 3 also has a lower projection 3c arranged to abut head carriage 2 and an extension 3d arranged to abut an upstanding portion 20a of a set plate 20 to be described hereinafter. A first fly-wheel 4 is mounted on a shaft 4a which is journalled by a bearing (not shown) fixed in chassis 1 and borne at the bottom end by a bottom member 5 (FIG. 2) fixed to chassis 1. The upper portion of shaft 4a forms a capstan. A second fly wheel 6 is mounted on a shaft which is also journalled by a bearing (not shown) fixed in chassis 1 and aligned laterally with shaft 4a. A member 7 for locking head carriage 2 is shown in FIGS. 3 and 4. A stud 1e in chassis 1 projects downwardly through an opening in member 7 and has a spring 7a secured between the bottom of member 7 and a flange at the lower end of stud 1e so that member 7 is urged upwardly by the action of spring 7a. An upstanding wall 7b of locking member 7 is engaged with the edge of a slot 1f in chassis 1 so that member 7 may be pivoted about the engaging point. Member 7 has another upstanding wall 7c which projects through a slot 1g in chassis 1. Upstanding wall 7c forms a shoulder 7d arranged to engage with the edge of slot 2e in head carriage 2 and a lip 7e projecting beyond slot 2e.

In FIG. 4, when a cassette 8 is snapped in place, lip 7e is pressed down by cassette 8 against biasing spring 7a and shoulder 7d is thus disengaged from the edge of lock slot 2e in head carriage 2. As a result, head carriage 2 which is biased by a suitable spring (not shown) is allowed to move forward, that is, to move rightward in FIGS. 3 and 4 or upward in FIG. 1.

Figure 5:
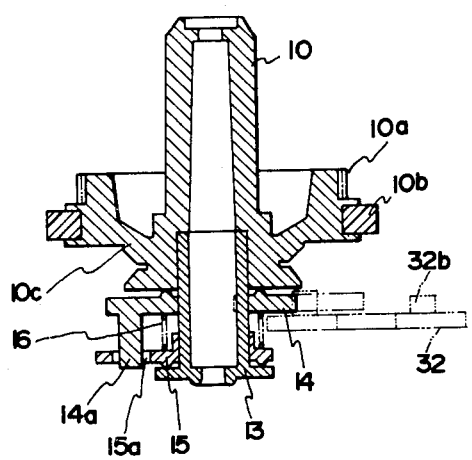
FIGS. 5 and 6 are cross-sectional and plan views of a take-up reel base and a part of an auto-stop mechanism associated therewith, respectively.
Figure 6:
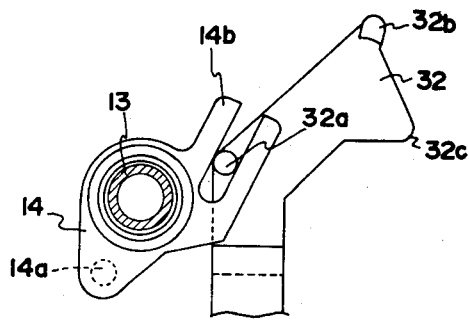

Numeral 9 designates a supply reel base which is rotatably journalled in chassis 1 and has a gear 9a at its circumference. Numeral 10 designates a take-up reel base. As best shown in FIGS. 5 and 6, take-up reel base 10 has a gear 10a at its circumference, a rubber roller 10b its arranged below gear 10a, and a groove 10c recessed below roller 10b for receiving a belt 12 which is trained around groove 10c and a pulley of a counter 11 secured to chassis 1 at its upper left end (FIG. 1). This take-up reel base 10 is snugly fitted on a bearing cylinder 13 which is journalled on a shaft (not shown) projecting from bottom member 5. Around the portion of bearing cylinder 13 between the lower wall of base 10 and a flange at the lower end of cylinder 13 are mounted first and second arms 14 and 15 for detecting the end of tape supply. First arm 14 has a projection 14a which is passed through a slot 15a in second arm 15. Between the facing surfaces of first and second arms 14 and 15 is compressed a spring 16. First and second arms 14 and 15 are forced into tight frictional engagement with the lower wall of base 10 and the flange of bearing cylinder 13 by the action of spring 16. A rotation force in the same direction is imparted to first and second arms 14 and 15 when take-up reel base 10 is rotated. First arm 14 is also provided with a fork 14b arranged to engage a projection 32a of an auto-stop lever 32 to be described hereinafter.

Numeral 17 designates a take-up unit (FIGS. 1, 7, 8 and 10). A lever 17a at one end is pivotally mounted on chassis 1. Substantially at the central portion of lever 17a is journalled a rotating shaft 17c on which a take-up pulley 17b is fixedly mounted at one end. The other end portion of shaft 17c is arranged for contact with the circumferential edge of rubber roller 10b of take-up reel base 10. At the other end of lever 17a is affixed stud 17d arranged to engage a front edge 20c of a set plate 20. A spring 17e is secured between chassis 1 and lever 17a so that lever 17a is biased in a clockwise direction about the pivot (in FIG. 7). That is, stud 17d is forced into engagement with front edge 20c of set plate 20. At the right side of chassis 1 (FIG. 1) is located a motor 18 having a pulley 18a. An endless belt 19 (FIG. 10) is trained around motor pulley 18a, take-up pulley 17b, second fly-wheel 6 and first fly-wheel 4.

Figure 8:
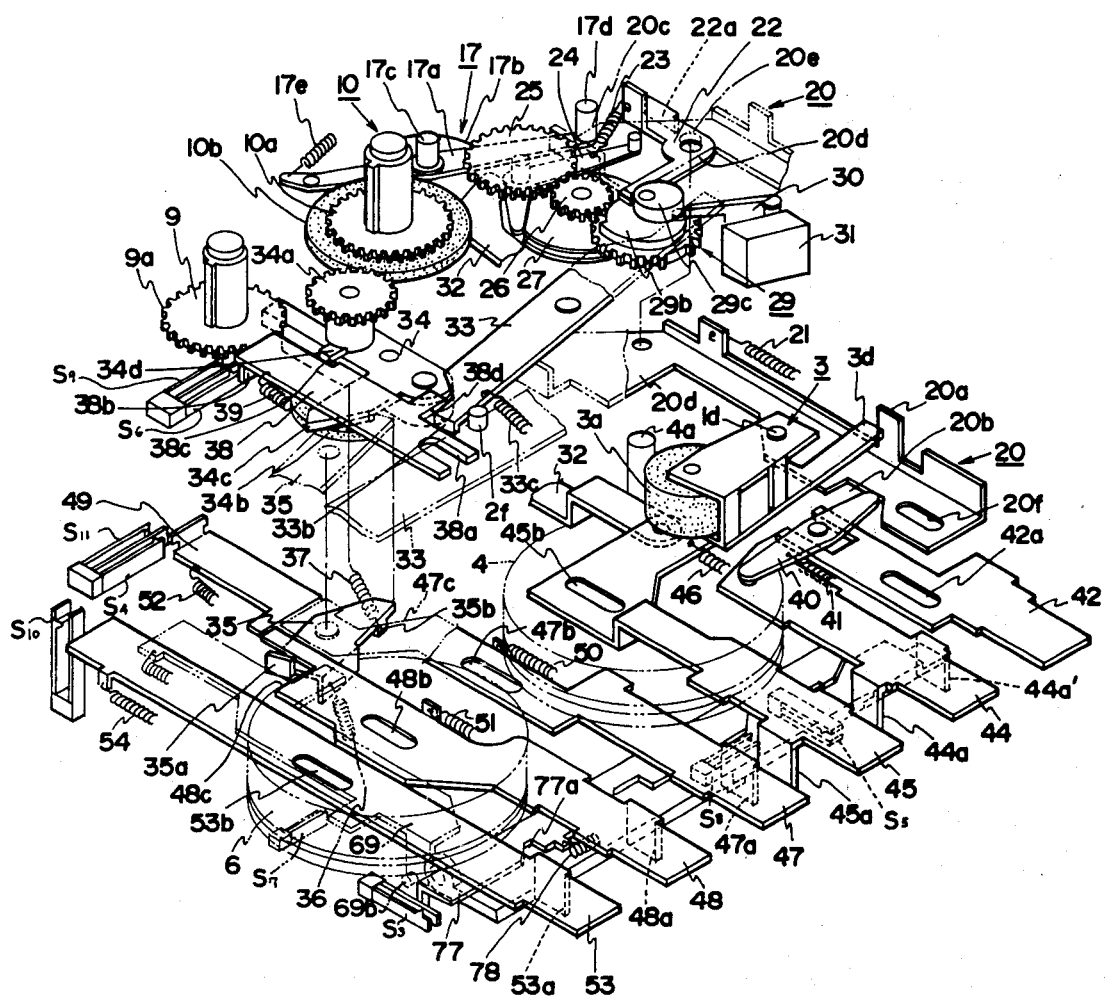
FIG. 8 is a perspective view of the levers and drive mechanism shown in FIG. 7.

Numeral 20 designates a set plate which is slidably mounted on chassis 1 (FIGS. 1 and 8). Set plate 20 is provided with an upstanding portion 20a arranged to engage with an extension 3d of pinch roller unit 3 when a cassette is loaded, a recess 20b for receiving one end of a lever arm 40 to be described hereinafter, a front edge 20c which is in contact with stud 17d of take-up unit 17, and a rear edge 20d which is in contact with a cam plate 29c. A spring 21 is secured between suitable positions on set plate 20 and chassis 1 to bias set plate 20 toward the lower end in FIG. 1. An L-shaped actuating member 22 is connected for rotation to set plate 20 by means of a pivot inserted in a hole 20e in set plate 20. A spring 23 is secured between one arm of actuating member 22 and the front end of set plate 20 so that the other arm of actuating member 22 is brought into engagement with cam plate 29c. Numeral 24 is a control lever which is rotatably mounted on a shaft which is embedded in chassis 1 and supports a first gear 25. When actuating member 22 is rotated counterclockwise in FIG. 8, a portion 22a suspending from member 22 is brought into engagement with one end of control lever 24 which is thus rotated clockwise about the shaft. Consequently, the other end of control lever 24 is abutted against auto-stop lever 32 which is in turn rotated counterclockwise.

Figure 9:
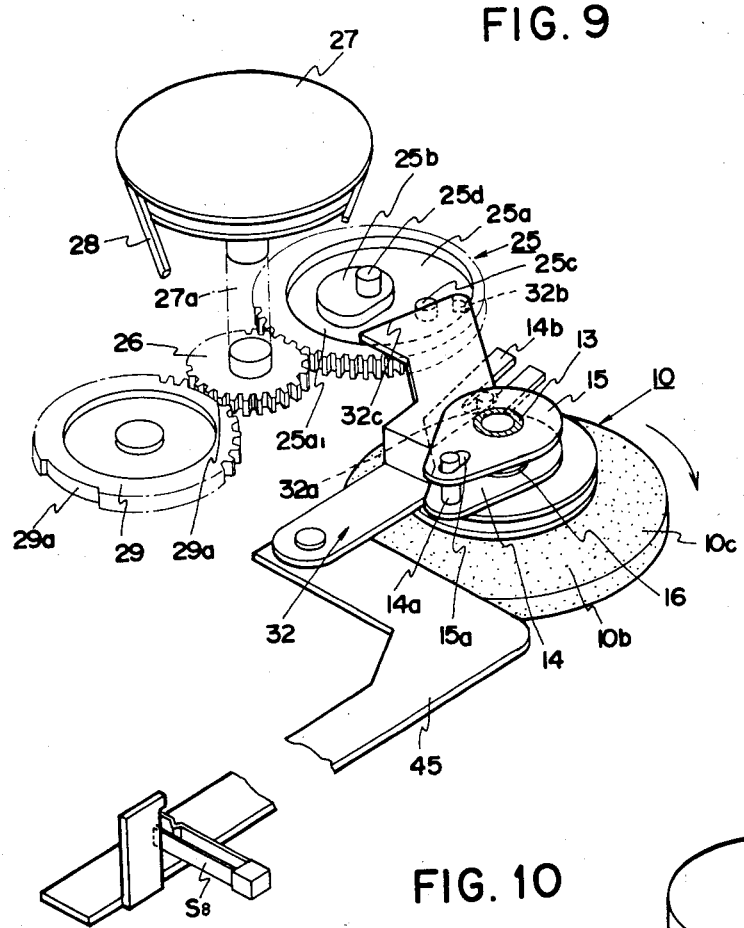
FIG. 9 is a perspective view of the auto-stop mechanism taken from the bottom of the recorder.
Figure 10:
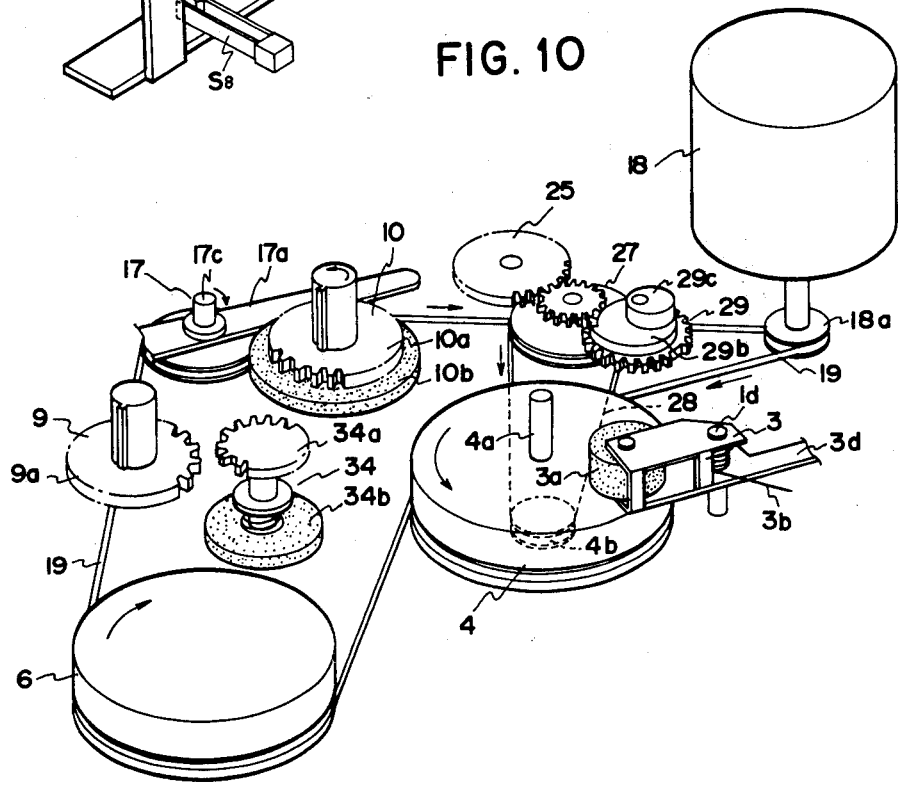
FIG. 10 is a perspective view of a belt drive mechanism.

Numeral 25 (FIG. 8) designates a first gear having its shaft journalled in chassis 1. In the perspective bottom view of FIG. 9, first gear 25 is provided with an eccentric circular recess 25a. A contoured cam plate 25b is located substantially at a central portion of recess 25a and a projection 25c is also located in recess 25a so that the projection is concentric about the shaft with the middle point in the narrowest space $25a_1$ defined between the inner wall of eccentric circular recess 25a and the outer edge of cam plate 25b. Arranged to mesh with first gear 25 is a second gear 26 which is fixedly mounted on a rotating shaft 27a having a pulley 27 at its bottom end and journalled in chassis 1 at the other end. A belt 28 is trained around pulley 27 and pulley 4b on the rotating shaft of first fly-wheel 4 (FIG. 10). Accordingly, first gear 25 is rotated through second gear 26 when first fly-wheel 4 is rotated.

Numeral 29 is a third gear which meshes with second gear 26 and has a shaft journalled in chassis 1 (FIGS. 7–10). Third gear 29 is not toothed at diametrically opposite portion 29a. Third gear 29 has a toothed cam 29b and a cam disc 29c formed integrally on the upper side thereof. A lock arm 30 is pivoted on chassis 1 and is extended so that its finger may engage with a tooth of cam 29b. A solenoid 31 may be energized to draw arm 30 to release its finger from the cam tooth.

Numeral 32 is an auto-stop lever pivoted to a stop lever 45 (FIG. 8). As best shown in FIGS. 5, 6 and 9, auto-stop lever 32 has a pin 32a arranged to engage with fork 14b of first arm 14. Lever 32 is provided at its one end with an arched tab 32b which is placed in eccentric circular recess 25a of first gear 25. Lever 32 is also provided at its one end with a shoulder 32c adapted to engage with a release pin 25d of first gear 25 as will be apparent from the following description.

In FIG. 9, when take-up reel base 10 is rotated in the tape take-up direction shown by an arrow in the drawings, a rotational force in the same direction is imparted to first arm 14 because spring 16 presses first arm 14 against take-up reel base 10. With pin 32a in engagement with fork 14b, auto-stop lever 32 is thus rotated clockwise. Consequently, tab 32b is brought into contact with the circumferential wall of eccentric circular recess 25a of first gear 25. On the contrary, when take-up base 10 is rotated in the tape supply direction, that is, in the direction opposite to the depicted arrow, first arm 14 is rotated in the opposite direction and auto-stop lever 32 is rotated counterclockwise. Consequently, tab 32b is brought into contact with the circumferential wall of cam plate 25b. In either case, when the travelling tape comes to the end and take-up reel base 10 stops rotating, first arm 14 becomes free from the directed frictional force and auto-stop lever 32 becomes free from the biasing force. As first gear 25 rotates, tab 32b is guided by the wall of recess 25a or cam plate 25b. The tab passes the narrowest space $25a_1$ and thereafter maintains its position which will follow the circle connecting the middle point of space $25a_1$ and projection 25c. Then, tab 32b comes in abutment with projection 25c. Auto-stop lever 32 is raised and shoulder 32c is abutted to release pin 25d on first gear 25. Eventually, tab 32b is released from projection 25c.

A play arm 33 (FIGS. 1, 7 and 8) is pivoted to chassis 1 substantially at the center and has at one end a roller 33a arranged to engage with cam disc 29c on third gear 29. A spring 33c is secured between the other end of play arm 33 and chassis 1 to bias play arm 33 counterclockwise about its pivot. Biasing spring 33c forces roller 33a into constant engagement with cam disc 29c. Facing an edge of the other end of play arm 33 is a control stud 2f on the bottom of head carriage 2.

When cassette 8 is loaded, head carriage 2 moves forward as explained above with reference to FIG. 4. Movement of carriage 2 is limited when control stud 2f abuts play arm 33. This position is a stand-by or intermediate position. As will be described hereinafter, when a play back lever 44 is pushed, solenoid 31 is actuated to draw lock arm 30, releasing the tip of lock arm from a tooth of cam plate 29b. Unlocking of toothed cam plate 29b allows cam disc 29c to be rotated a few degrees of angle by means of set plate 20 which engages at rear edge 20d with can disc 29c and is biased by spring 21 toward the lower end in FIGS. 1, 7 and 8. As a result, the uncut portion 29a which has been facing second gear 26 is displaced and third gear 29 comes in mesh with second gear 26. Third gear 29 is rotated until the opposite uncut portion 29c reaches the position facing second gear 26. With rotation of third gear 29, roller 33a of play arm 33 comes into engagement with the largest lobe of cam disc 29c so that play arm 33 is pivoted clockwise. Pivotal movement of play arm 33 allows head carriage 2 to move further forward into the recording playback position. With head carriage 2 in the recording playback position, if a stop lever 45 is pushed, solenoid 31 is again actuated to release lock arm 30 from toothed cam 29b. Now, cam disc 29c is rotated a few degrees of angle by means of play arm 33 which engages at roller 33a with cam disc 29c and is biased by spring 33c. Third gear 29 comes in mesh with second gear 26 and is thus rotated. Play arm 33 is pivoted counterclockwise until roller 33a comes into engagement with the smallest lobe of cam disc 29c. As a result, head carriage 2 is returned to the intermediate position.

Numeral 34 designates a fast feed unit having a shaft journalled in chassis 1 and another rotatable shaft. As best shown in FIG. 10, a gear 34a adapted to selectively mesh with gear 9a of supply reel base 9 or gear 10a of take-up reel base 10 is mounted on the other rotatable shaft at the top. A rubber roller 34b adapted to selectively engage with first or second fly-wheel 4 or 6 is mounted on the other rotatable shaft at the bottom. Fast feed unit 34 (FIG. 8) further includes a lateral extension 34c arranged to abut a fast feed arm 35 and a tongue 34d arranged to abut a slide lever 38.

Fast feed arm 35 (FIG. 8) is pivotally mounted on the forward portion of fast forward lever 47. Arm 35 has a spring 36 secured between one end of arm 35 and chassis 1 and another spring 37 secured between the other end of arm 35 and unit 34. Arm 35 is also provided with an upstanding tab 35a arranged to engage with an edge 48c of a rewind lever 48 and a suspending tab 35b arranged to engage with a bent portion 47c of fast forward lever 47.

Associated with fast forward lever 47 is a slide lever 38 which includes a groove 38a formed at one end for receiving a guide stud on chassis 1, a lip 38b formed at the other end for cooperating with a suitable groove (not shown) in chassis 1, a stepped portion 38c arranged to engage with extension 34d of fast feed unit 34, and a lateral extension 38d arranged to engage with a suspending lip 33b of play arm 33. A spring 39 is secured between slide lever 38 and chassis 1 to bias slide lever toward the lower side in FIG. 7.

When fast forward lever 47 is pushed, arm 35 is rotated with its suspending tab 35b in engagement with bent portion 47c of lever 47. Then arm 35 is brought into engagement with lateral extension 34c of fast feed unit 34 so that unit 34 is pivoted clockwise. As a result, rubber roller 34b is brought into frictional engagement with first fly-wheel 4 and gear 34a in mesh with gear 10a of take-up reel base 10 (see FIG. 25). Accordingly, take-up reel base 10 is rotated at a high speed by means of rotating fly-wheel 4 via unit 34 to fast feed the tape. On the other hand, when rewind lever 48 is pushed, its edge 48c is brought into engagement with upstanding tab 35a of the arm 35 so that arm 35 is rotated clockwise against biasing spring 36. Fast feed unit 34 is rotated counterclockwise with the aid of spring 37. As a result, rubber roller 34b is brought into engagement with second fly-wheel 6 and gear 34a in mesh with gear 9a of feed reel base 9 (see FIG. 26). Accordingly, supply reel base 9 is rotated at a high speed to rewind the tape.

On support pin 1d anchored in chassis for pivoting pinch roller unit 3 is pivotally mounted a lever arm 40 (FIG. 8) substantially at its center. One end of lever arm 40 is connected to a playback lever 44 by a pivot and the other end extends in recess 20b of set plate 20. Lever arm 40 is biased counterclockwise about pin 1d by a spring 41.

Numeral 42 is a pause lever which has a guide slot 42a cooperating with a suitable stud on chassis 1 and a a channel 42b formed in the extreme portion to preclude abutment with support pin 1d. Associated with pause lever 42 is a lock plate 43 (FIG. 1) which is rotatably mounted on a pivot anchored in chassis 1 and penetrating through a slot 20f in set plate 20. Pause lever 42 may be engaged with or disengaged from lock plate 43. Once pause lever 42 is pushed, a stud 42c on lever 42 is brought into engagement with a jaw of lock plate 43, maintaining the lever locked. When pause lever 42 is again pushed, stud 42c is disengaged from the jaw. Such a locking mechanism is generally well known.

Referring to FIG. 8 again, a play lever 44 has a pair of lock members 44a and 44a'. A stop lever 45 has a lock member 45a and a guide slot 45b, and is biased by a spring 46 toward the lower side in FIG. 7. Fast forward lever 47 has a lock member 47a and a guide slot 47b. Rewind lever 48 has a lock member 48a and a guide slot 48b. The rearmost ends of the above-mentioned fast forward and rewind levers 47 and 48 is abutted to a sub-lever 49. Springs 50, 51 and 52 bias these levers 47, 48 and 49 respectively toward the front side of the recorder.

Numeral 53 is a record lever having a lock member 53a and a guide slot 53b. A spring 54 biases lever 53 toward the front of the recorder. Although not depicted not in the Figures, each of levers 42, 44, 47, 48 and 53 is supported by suitable guide means affixed on chassis 1 at the rear of the locking member. Except for play lever 44, the levers are supported at two positions, by means of the guide slots and guide means so that the levers are allowed linear movement.

Figure 11:
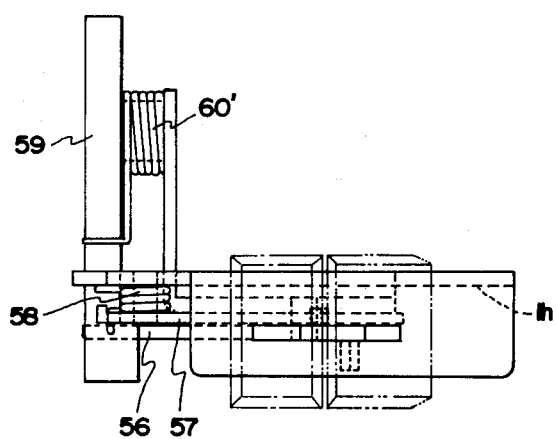
FIGS. 11 and 12 are plan and side views of an interval detecting mechanism, respectively.
Figure 12:
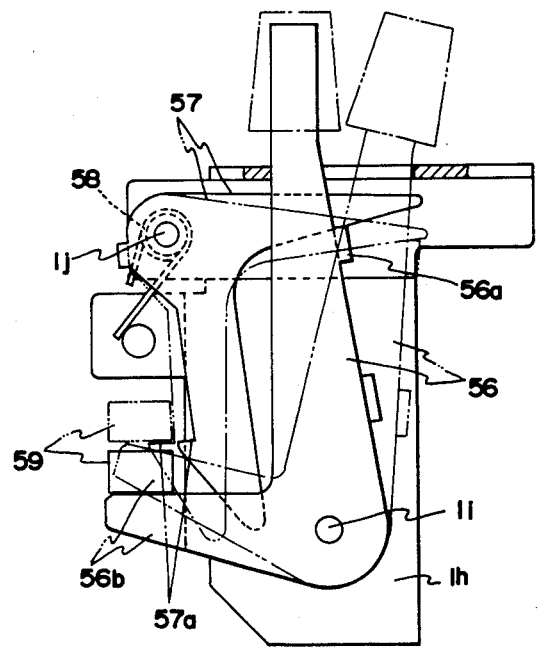

Numeral 56 designates a lever for detecting an interval between tunes. As shown in FIGS. 1, 11 and 12, chassis 1 at the right side has a bracket 1h to which L-shaped lever 56 is mounted by means of a pivot 1i. An inverted L-shaped lock plate 57 is also mounted to bracket 1h by means of another pivot 1j. Since lock plate 57 is biased clockwise (in FIG. 12) by a spring 58, one arm of lock plate 57 is always engaged with a tab 56a of lever 56. The other arm of lock plate 57 has a jaw 57a adapted to engage with one end of a control member 59 for controlling the rotation of a third lock plate 76 to be described hereinafter. Normally a lower arm 56b of lever 56 abuts control member 59 at its bottom. Control member 59 is biased clockwise (in FIG. 19) by a coil spring 60' (FIG. 11) so that the one end of control member 59 is forced onto or held by lower arm 56b of lever 56 and the other end is in contact with third lock plate 76.

Locking is accomplished as follows. When interval detecting lever 56 is pushed or turned clockwise in FIG. 12 as shown by a dot-and-dash line, lower arm 56b pushes up control member 59 which is rotated counterclockwise in FIG. 19 against biasing coil spring 60'. As lateral tab 56a is displaced downward, lock plate 57 is rotated clockwise in FIG. 12 by means of biasing spring 58. Accordingly, jaw 57a of locking plate 57 is first abutted against control member 59 at its side and then brought into biting engagement with control member 59 as control member 59 is moved upward by means of arm 56b beyond the upper edge of jaw 57a. Control member 59 is thus locked. Locking is released by pulling lever 56 to the normal position. Lock plate 57 is rotated counterclockwise in FIG. 12 by means of lateral tab 56a against biasing spring 58 and jaw 57a is disengaged from control member 59.

Figure 13:
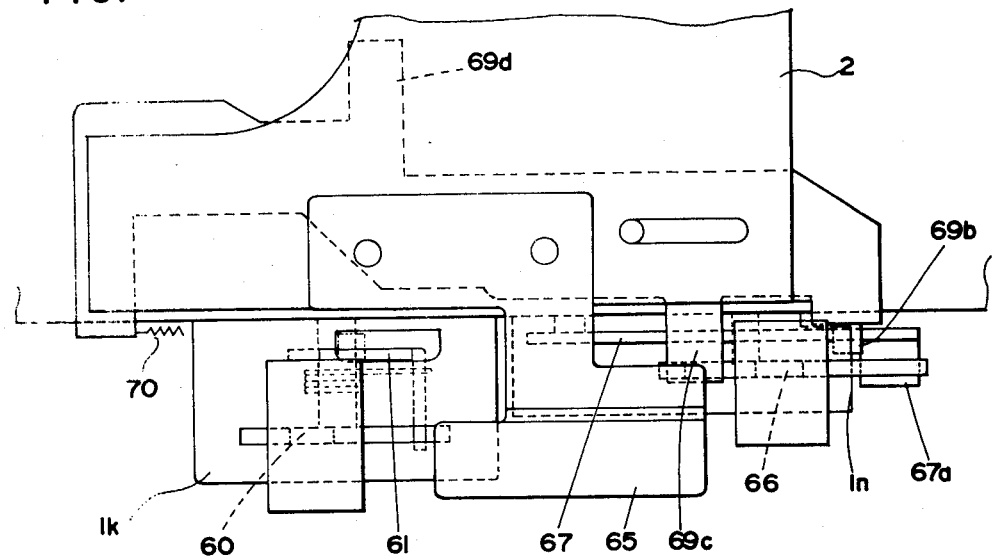
FIGS. 13 and 14 are plan and side views of mechanisms associated with eject and auto-repeat levers, respectively.
Figure 14:
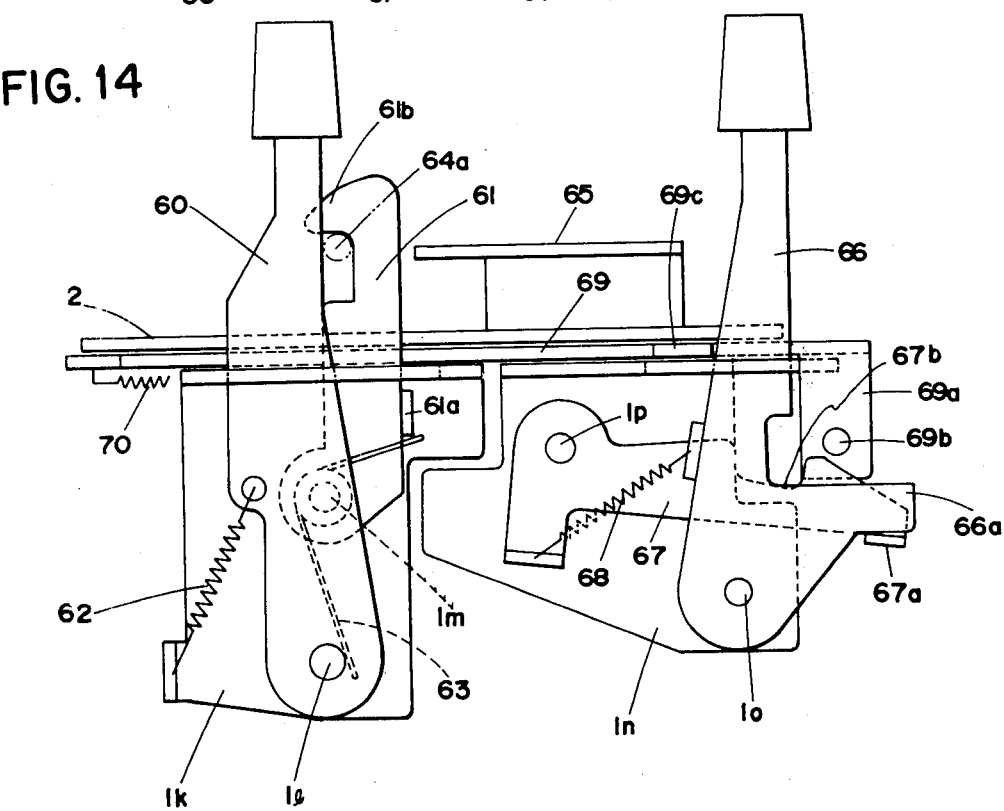
Figure 15:
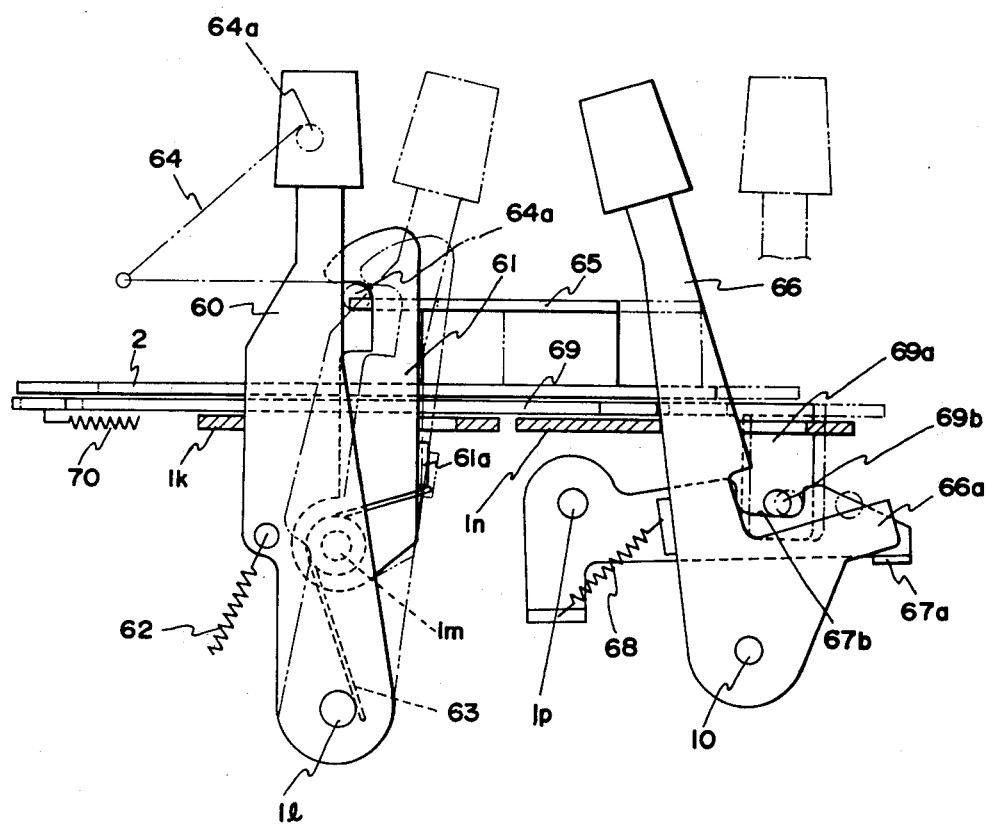
FIG. 15 is an illustration of the eject auto-repeat mechanisms under the actuated condition.

Numeral 60 designates an eject lever which is mounted on a pivot 1l affixed to a bracket 1k suspending from chassis 1 at the left side in FIGS. 1, 13 and 14. A sub-eject lever 61 is also mounted on another pivot 1m affixed to bracket 1k. When eject lever 60 is pulled or turned clockwise in FIGS. 13 and 14 against the biasing force of a spring 62 secured between eject lever 60 and bracket 1k, the lever is pressed against a lateral extension 61a of sub-eject lever 61, which is also turned clockwise against the biasing force of a spring 63 as shown in FIG. 15. This clockwise rotation of lever 61 causes a hook 61b at its upper end to be disengaged from a locking bar 64a formed at one side of a cover 64 which serves to cover the cassette when a cassette is loaded. Thus cover 64 is released. Further, when lever 60 is moved rightward in FIGS. 13 to 15 as described above, it is further abutted to a sub-plate 65 secured to head carriage 2. Sub-plate 65 is moved rightward so that head carriage 2 is restored to the normal or rest position. The backward movement of head carriage 2 allows locking member 7 (FIG. 4) to move upward so that shoulder 7d is engaged with the edge of lock slot 2e. Head carriage 2 is locked in the rest position in this manner.

Numeral 66 designates an auto-repeat lever which is mounted on a pivot 1o affixed to a bracket 1n suspending from chassis 1 at the left side. Associated with auto-repeat lever 66 is a repeat lock plate 67 which is mounted on a pivot 1p affixed to bracket 1n. A spring 68 is secured between auto-repeat lever 66 and repeat lock plate 67 so as to force a lip 66a of lever 66 into engagement with a lateral extension 67a of lock plate 67. A repeat slide lever 69 is slidably mounted between chassis 1 and head carriage 2. Lever 69 can be moved forward and backward or to the left and the right and is biased to the right in FIGS. 13 and 14 by a spring 70. Repeat slide lever 69 has a suspending wall 69a at its right end, which in turn is provided with a locking stud 69b.

When auto-repeat lever 66 is pushed or turned leftward in FIGS. 13 and 14, it is abutted to a lateral extension 69c of repeat slide lever 69, which is moved leftward. Pivotal movement of lever 66 allows repeat lock plate 67 biased by spring 68 to rotate in the same direction. Since repeat slide lever 69 with a lock stud 69b is shifted leftward as shown in FIG. 15, repeat lock plate 67 at its groove 67b is engaged with lock stud 69b. Repeat slide lever 69 is thus maintained in this shifted position. On the other hand, when auto-repeat lever 66 is moved back (to the right in FIGS. 13 to 15), lip 66a presses down lateral extension 67a and repeat lock plate 67 is rotated in the same clockwise direction as autorepeat lever 66 so that groove 67b is disengaged from stud 69b. Repeat slide lever 69 is moved to the right by means of spring 70 and restored to the initial position.

Numeral 71 (FIG. 16) designates an angular member for stopping the reel bases. Angular member 71 is pivoted on chassis 1 at one end and provided at the other end with a pin 71a arranged to engage with extension 3d of pinch roller unit 3. A spring 72 is secured between pin 71a and chassis 1 to force the pin into abutment with extension 3d. Member 71 at the angular portion is provided with teeth 71b arranged to mesh with gear 10a of take-up reel base 10. Provided that eject lever 60 is pulled to the right in FIG. 15, head carriage 2 is moved back and pinch roller unit 3 is turned counterclockwise in FIG. 16 (due to engagement of head carriage 2 with lower projection 3c) and hence, extension 3d of unit 3 presses against pin 71a. Angular member 71 is turned counterclockwise so that toothed portion 71b meshes with gear 10a of take-up reel base 10, stopping rotation of the reel base.

Figure 17:
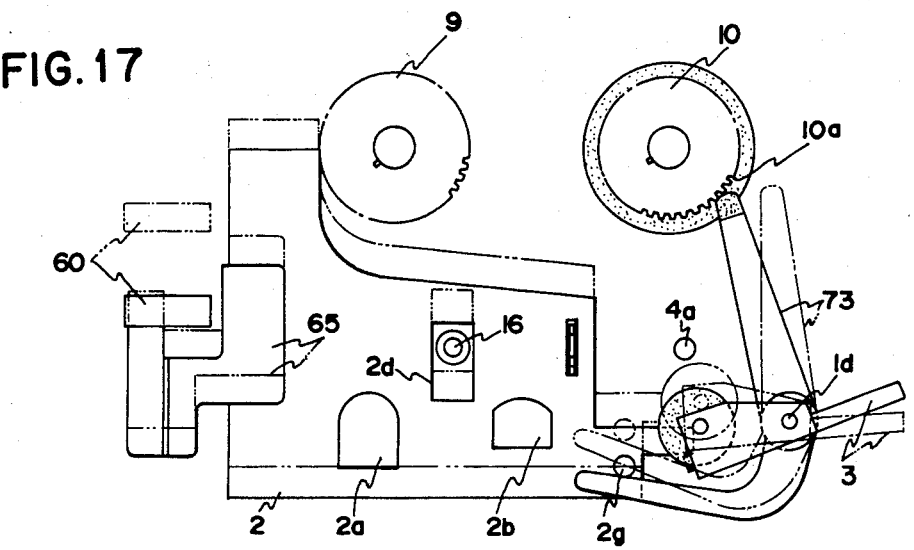
FIGS. 17 and 18 are plan views illustrating other different examples of the reel base braking mechanism.
Figure 18:
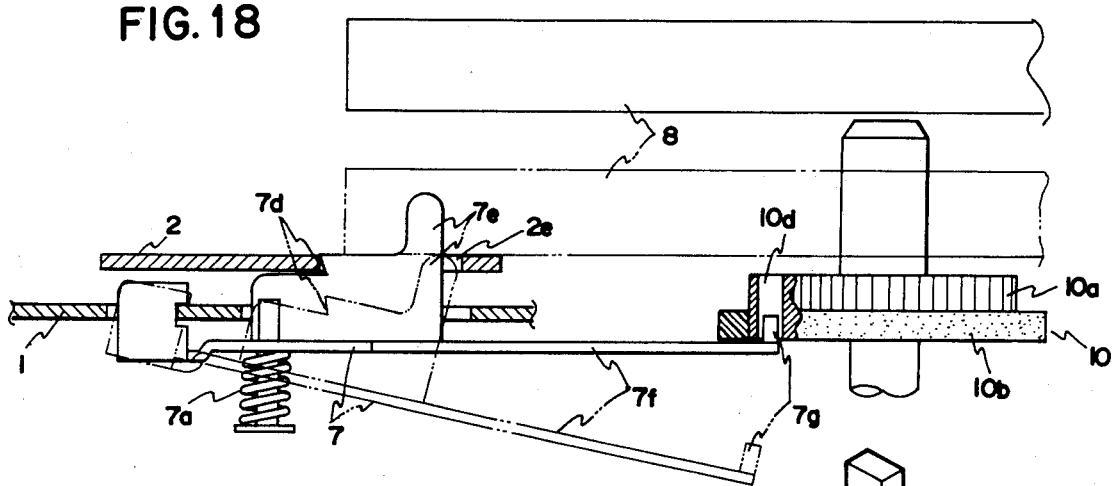

FIGS. 17 and 18 show another example of means for forcibly stopping take-up reel base 10 when eject lever 60 is pulled. In FIG. 17, a substantially L-shaped member 73 for stopping reel base 10 is pivoted at its center on support pin 1d. One arm of member 73 is urged against a pin 2g anchored on head carriage 2 by suitable biasing means (not shown) and the other arm terminates at the proximity of take-up reel base 10. When eject lever 60 is pulled and head carriage 2 is consequently moved back, pin 2g pushes the one arm of member 73 to pivot the latter counterclockwise so that the tip of the other arm is forced into frictional engagement with gear 10a. Reel base 10 is thus braked.

In FIG. 18, member 7 for locking head carriage 2 is further extended to form a stop bar 7f which terminates at a projection 7g. Correspondingly, take-up reel base 10 is provided with a plurality of vertically extending openings 10d. When eject lever 60 is pulled to remove cassette 8, lock member 7 is restored to the initial position by the action of spring 7a and at the same time projection 7g at the tip of stopper bar 7f is pressed against the bottom of take-up reel base 10 and eventually inserted in one of openings 10d. The rotation of take-up reel base 10 is thus stopped.

Figure 19:
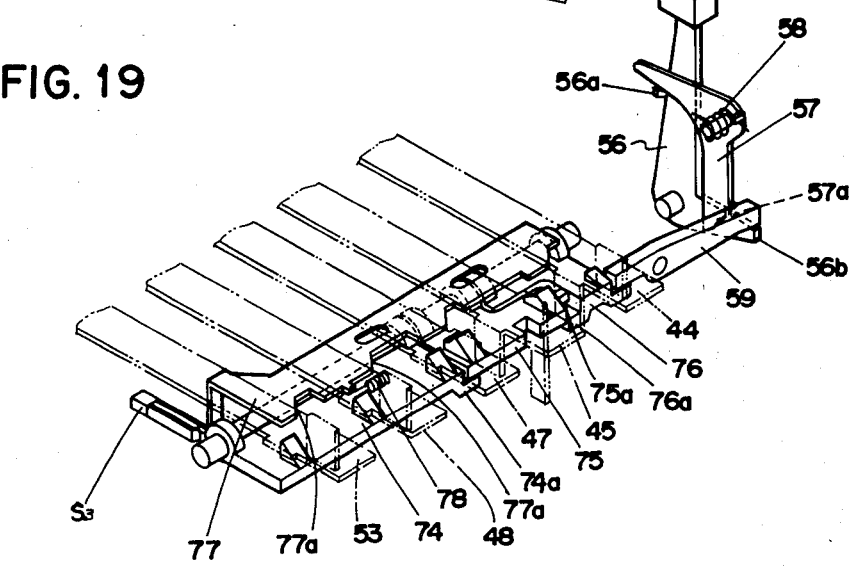
FIG. 19 is a perspective view illustrating the levers and the associated locking mechanism.
Figure 20A:
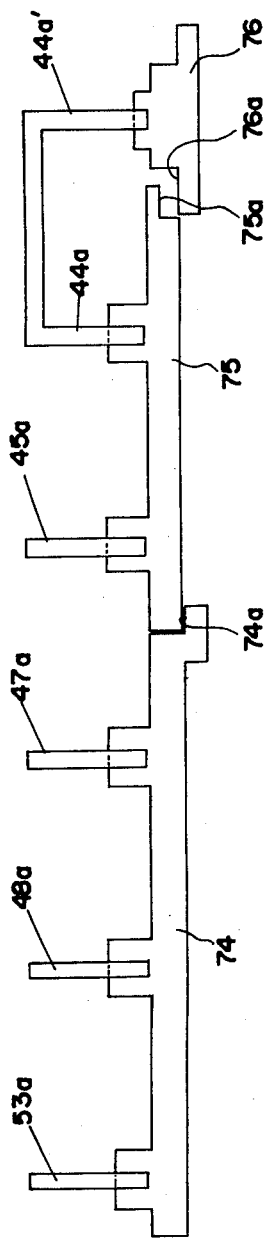
FIGS. 20A to 20C are schematic front views showing the relation of the levers and lock plates.
Figure 20B:
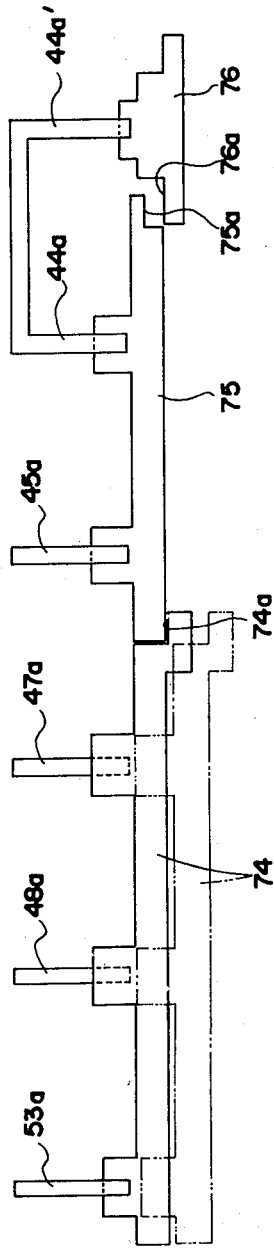
Figure 20C:
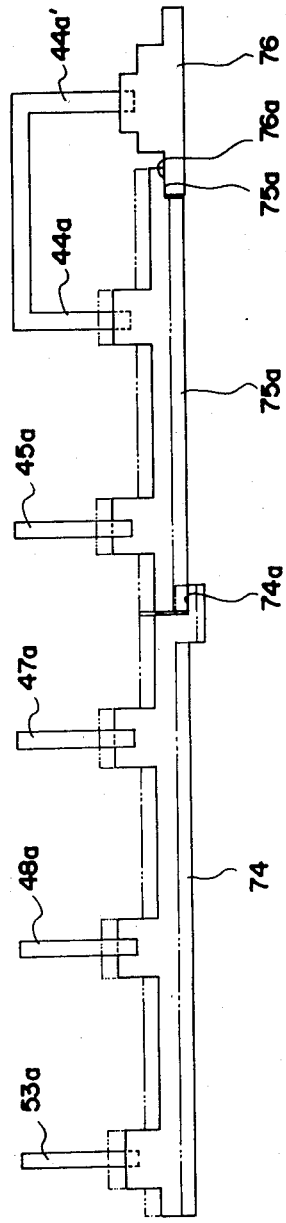

Numerals 74, 75 and 76 in FIGS. 19 to 21 designate first, second and third lock plates pivoted on a common shaft fixedly mounted on chassis 1. Each of these plates is held in a horizontal plane by means of springs (not shown). First lock plate 74 covers an area corresponding to lock members 47a, 48a and 53a suspending from fast forward, rewind and record levers 47, 48 and 53; second lock plate 75 covers an area corresponding to lock members 45a and 44a suspending from stop and playback levers 45 and 44; and third lock plate 76 covers an area corresponding to lock member 44a' suspending from playback lever 44. First plate 74 has an offset edge 74a adjacent the contiguous end of second plate 75, which in turn has an offset edge 75a at the opposite end. In this example, third plate 76 is also stepped at 76a.

With the illustrated arrangement, first lock plate 74 can be depressed independent from the remaining plates whereas second lock plate 75 engages with and presses down both first and third plates 74 and 76 when it is depressed. Since an appropriate clearance is provided between offset edges 75a and 76a of second and third plates 75 and 76, third plate 76 is depressed only after second plate 75 has moved through the clearance.

The configurations of the respective lock plates and the corresponding lock members are illustrated in FIGS. 21A to 21E.

Third locking plate 76 (FIG. 21A) has a hook 76b consisting of an inclined surface 76b and an adjoining vertical surface 76$b_2$ while lock member 44a' suspending from playback lever 44 has a check block 44$a'_1$. When playback lever 44 is moved leftward, check block 44$a'_1$ engages with and slides along inclined surface 76$b_1$ to depress third lock plate 76 and then passes over the inclined surface into locking engagement with vertical surface 76$b_2$. Second lock plate 75 (FIG. 21B) has a contour 75b for controlling the distance of depression which consists of an upwardly inclined surface 75$b_1$, a steep descending surface 75$b_2$, a moderate descending surface 75$b_3$, and a vertical surface 75$b_4$, while lock member 44a suspending from playback lever 44 has a smooth ridge 44$a_1$ which is not locked by control contour 75b. Ridge 44$a_1$ of lock member 44a slides along upwardly inclined surface 75$b_1$. When the ridge reaches the top between surfaces 75$b_1$ and 75$b_2$, second lock plate 75 is depressed to its maximum. Third lock plate 76 is also depressed together with plate 75 at this point. Second lock plate 75 has another contour 75c (FIG. 21C) for controlling the distance of depression which consists of an upwardly inclined surface 75$c_1$, a downwardly inclined surface 75$c_2$, and a vertical surface 75$c_3$. The top of contour 75c has the same height as that of contour 75b. Release member 45a of stop lever 45 has a contact surface 45$a_1$ and a smooth bottom surface so that the member is not locked by control contour 75c. Release member 45a at contact surface 45$a_1$ engages with and slides along control contour 75c. When the release member reaches the top, second lock plate 75 is depressed to its maximum. First and third lock plates 74 and 76 are depressed together with second plate 75 so that locking of these plates is released if they had been locked. First lock plate 74 has a hook 74b (FIG. 21D) which consists of an upwardly inclined surface 74$b_1$, a downwardly inclined surface 74$b_2$, and a vertical surface 74$b_3$, while lock members 47a and 48a of fast forward and rewind levers 47 and 48 have check blocks 47$a_1$ and 48$a_1$, respectively, each of which is adapted to engage with and slide along upwardly and downwardly inclined surfaces 74$b_1$ and 74$b_2$ and then come in locking relationship with vertical surface 74$b_3$. First lock plate 74 has another hook 74c (FIG. 21E) which consists of an upwardly inclined surface 74$c_1$ and vertical surface 74$c_2$ while lock member 53a of record lever 53 has a check block 53$a_1$ adapted to engage with and slide along upwardly inclined surface 74$c_1$ and then come in locking relationship with vertical surface 74$c_2$.

Referring to FIGS. 8 and 19, numeral 77 designates a slide lever which is biased to the right by a spring 78 for controlling a switch $S_3$. This slide lever 77 is provided with a plurality of recesses which correspond to lock member 44a of playback lever 44, lock member 47a of fast forward lever 47, lock member 48a of rewind lever 48, and lock member 53a of record lever 53. The recesses have slant surfaces 77a so that lever 77 is moved to the left against biasing spring 78 when any one of levers 44, 47, 48 and 53 is pushed. It is to be noted that in correspondence with slant surface 77a for record lever 53, slide lever 77 is provided with a well-known lock means (not shown) for preventing record lever 53 from being pushed when any one of the remaining levers has been pushed.

Figure 7:
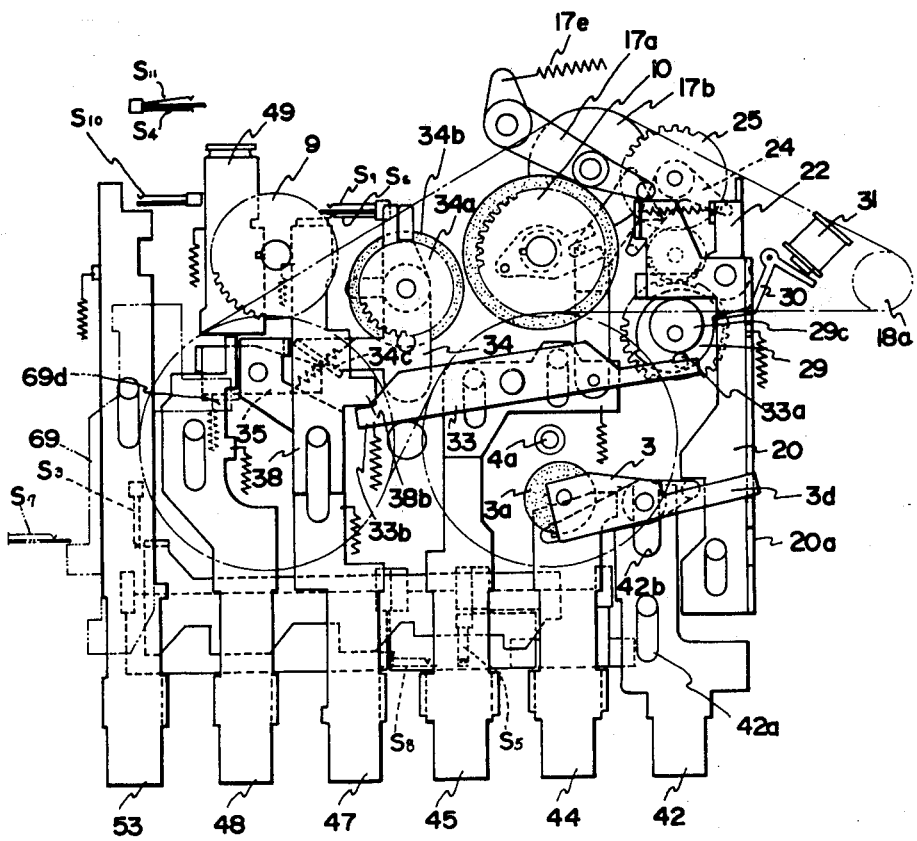
FIG. 7 is a plan view of the tape recorder with the chassis removed to illustrate levers and a drive mechanism.
Figure 22:
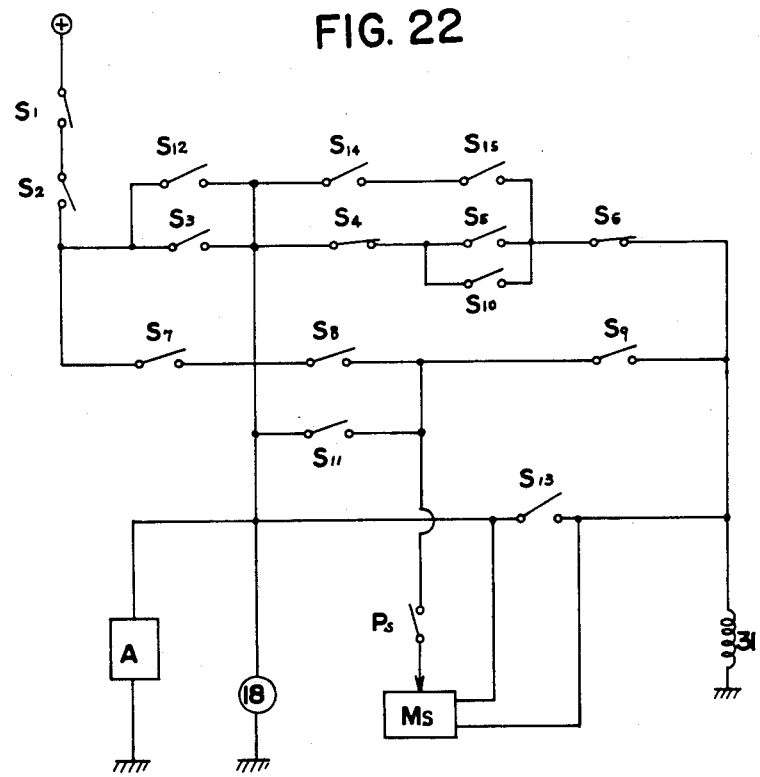
FIG. 22 is a diagram of an electrical circuit combined with the tape recorder drive mechanism.

FIG. 22 is a diagram illustrating a circuit for electrically actuating and controlling the components of the recorder described above, in which $S_1$ is a power switch, $S_2$ is a switch associated with a timer and designed to be normally closed and to be opened during actuation of the timer until the selected time is reached, $S_3$ is a switch designed to be closed when switch control slide lever 77 is moved, $S_4$ is a switch designed to be opened when fast forward lever 47 or rewind lever 48 is pushed to shift sub-lever 49, $S_5$ is a switch designed to be closed when second lock plate 75 is depressed, $S_6$ is a switch designed to be closed when play arm 33 is pivoted to shift slide lever 38, $S_7$ is a switch designed to be closed when repeat slide lever 69 is moved, $S_8$ is a switch designed to be closed when stop lever 45 is pushed, $S_9$ is a switch designed to be closed when slide lever 38 is moved, $S_{10}$ is a switch designed to be closed when record lever 53 is pushed, $S_{11}$ is a switch designed to be closed when sub-lever 49 is shifted, $S_{12}$ and $S_{13}$ are remote control switches associated with parts not shown in the Figures, $S_{12}$ being a switch designed to be closed during the playback operation and $S_{13}$ being a switch designed to be closed during the stop operation, $S_{14}$ is a memory switch associated with a part not shown in the Figures, $S_{15}$ is a counter switch designed to be closed when counter 11 counts "999", Ps is a switch designed to be closed when interval detecting lever 56 is actuated, MS is a circuit for detecting the interval between tunes, and A is an amplifier. Most of the above switches are depicted in FIGS. 7 and 8. Numerals 18 and 31 in the circuit diagram are the motor and the solenoid described above.

The operation of the above-described arrangement is as follows.

PLAYBACK OPERATION

Figure 23:
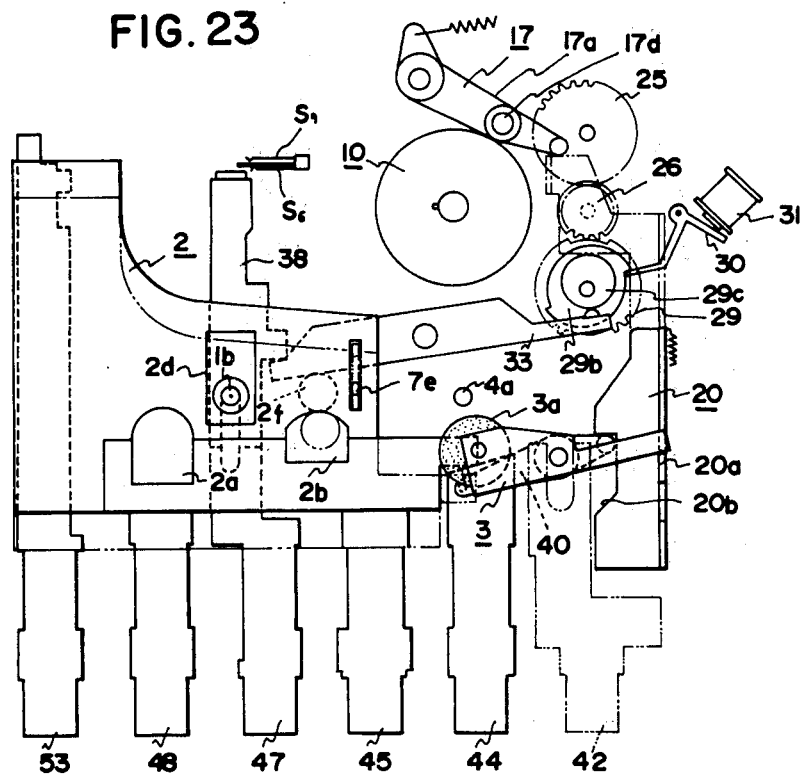
FIG. 23 is a plan view similar to FIG. 7 illustrating the location of head carriage in the intermediate position.

Reference should be made to FIG. 23. First cassette 8 is loaded on head carriage 2. Since lip 7e of lock member 7 is pressed down, shoulder 7d is disengaged from the edge of slot 2e of head carriage 2. Then head carriage 2 moves forward until control stud 2f at the bottom thereof abuts play arm 33. In this intermediate position, heads 2a and 2b on carriage 2 are partially inserted in the windows in the cassette.

As head carriage 2 moves forward, pinch roller unit 3 which has been limited at lower projection 3c by head carriage 2 is rotated clockwise by the action of spring 3b to abuts its extension 3d against upstanding portion 20a of set plate 20 so that pivotal movement of unit 3 is obstructed. In this position, pinch roller 3a is spaced apart from capstan 4a.

Figure 24:
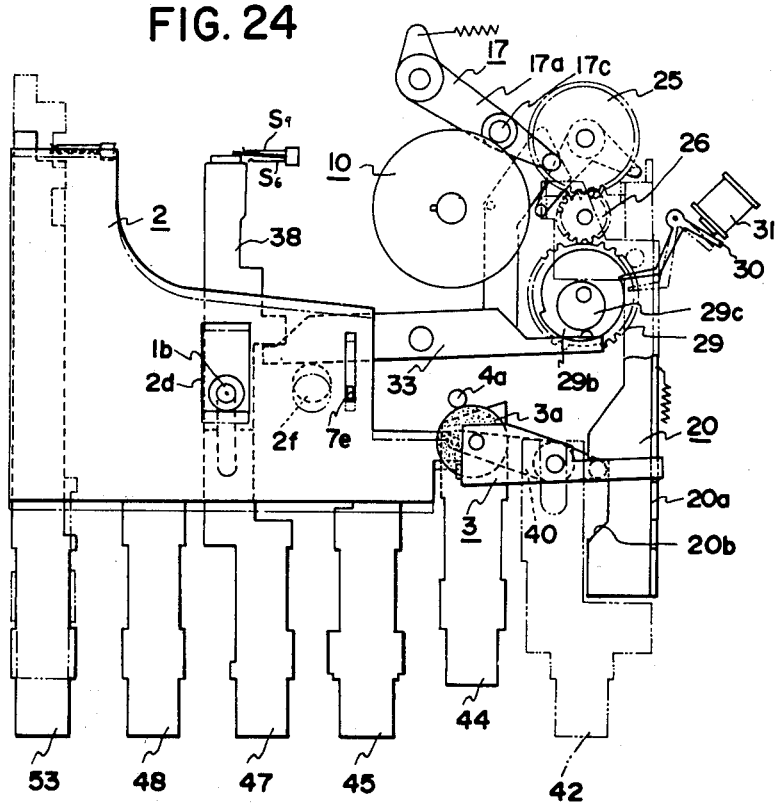
FIG. 24 is a plan view similar to FIG. 7 illustrating the playback operation.

Next, playback lever 44 is pushed as shown in FIG. 24. Check block 44$a'_1$ of lock member 44a' is brought into engagement with hook 76b of third lock plate 76. Lock member 44a pushes down second lock plate 75 to close switch S5 beneath plate 75. Lock member 44a also engages with slant surface 77a to shift slide lever 77 to close switch S3. Provided that power switch S1 and timer switch S2 be closed, motor 18 is then conducted. Since switches S4 and S6 are normally closed, solenoid 31 is also conducted. Actuated solenoid 31 draws lock arm 30 to disengage its finger from toothed cam 29b. Cam disc 29c is rotated a few degrees of angle by means of spring-biased set plate 20 so that third gear 29 comes in mesh with second gear 26. Since motor 18 has been actuated, first fly-wheel 4 is being rotated via belt 19. Pulley 27 and hence, second gear 26 is being rotated via belt 28. Accordingly, third gear 29 is rotated about 180 degrees. This half turn of third gear 29 brings the largest lobe of cam disc 29c into engagement with roller 33a. Play arm 33 is thus pivoted to release control stud 2f from head carriage 2. Head carriage 2 is allowed to move further forward until slot 2d engages with stop pin 1b.

Since edge 20d of set plate 20 faces the smallest lobe of cam disc 29c, set plate 20 biased by spring 21 is moved toward the lower side in FIG. 24 to release upstanding portion 20a away from extension 3d of pinch roller unit 3. Unit 3 is allowed to be further pivotally rotated so that pinch roller 3a is forced into pressure contact with capstan 4a.

As set plate 20 is moved toward the lower side, take-up unit 17 having stud 17d engaged with extreme edge 20c follows the extreme edge with the aid of spring 17e. Lever 17a is pivoted so that rotating shaft 17c is brought into frictional engagement with rubber roller 10b. Since take-up pulley 17b is being rotated via belt 19, take-up reel base 10 is rotated.

As described above, the rotation of motor 18 is transmitted to take-up reel base 10 and capstan 4a or the rotating shaft of first fly-wheel 4 and at the same time amplifier A is actuated so that the tape is played back.

FROM PLAYBACK OPERATION TO STOP OPERATION

Stop lever 45 is pushed during the playback operation. Release member 45a presses down second lock plate 75 which in turn depresses third lock plate 76 further. Third lock plate 76 is thus released from lock member 44a' of playback lever 44, which is restored to the rest position by the action of spring 41 via lever arm 40. Release member 45a also closes switch S8. Since play arm 33 has been turned clockwise, slide lever 38 which is in engagement with play arm 33 has been pressed forward to open switch S6 and close switch S9. Thus solenoid 31 is energized to release lock arm 30 from toothed cam 29b, allowing cam disc 29c to rotate a few degrees of angle so as to bring third gear 29 in mesh with second gear 26. As a result, third gear 29 is rotated about 180 degrees so that play arm 33 is restored to the initial position. Play arm 33 abuts and presses control stud 2f to move back head carriage 2 to the intermediate position. Since set plate 20 is urged forward against biasing spring 21, its extreme edge 20c functions to return take-up unit 7 to the initial position against biasing spring 17e. Rotating shaft 17c is moved apart from rubber roller 10b of take-up reel base 10 which ceases to rotate. Forward movement of set plate 20 also causes upstanding portion 20a to push forward extension 3d of pinch roller unit 3. Then unit 3 is pivoted counterclockwise so that pinch roller 3a is moved apart from capstan 4a.

As described above, take-up reel base 10 ceases to rotate and pinch roller 3a is separated from capstan 42 so that the tape stops running. Further, slide lever 77 is restored to the rest position, switch S3 is released to interrupt electrical conduction of motor 18 and amplifier A.

Thereafter, eject lever 60 is pulled as shown in FIG. 15. When head carriage 2 has been just retracted to the rest position via sub-plate 65, sub-eject lever 61 is pivotally entrained so that hook 61b is released from locking bar 64a of cover 64. Then cover 64 is sprung up and accordingly cassette 8 is removed from head carriage 2.

As head carriage 2 is moved back, shoulder 7d which has been abutted to the bottom of carriage 2 is snapped in lock slot 2e after the edge of slot 2e passes the shoulder. When eject lever 60 is released, shoulder 7d is in locking engagement with slot 2e. The eject operation is conducted as above.

RECORDING OPERATION

With cassette 8 loaded in head carriage 2, record lever 53 is pushed. Check block 53a1 of lock member 53 is brought into engagement with hook 74c of first lock plate 74. In accordance with pushing of record lever 53, switch S10 is closed to actuate a recording circuit (not shown). Further, lock member 53a of lever 53 shifts slide lever 77 to close switch S3. Then motor 8 and solenoid 31 are energized. Then, head carriage 2 moves further forward through the same procedures as in the above-described playback operation and set plate 20 moves backward, bringing pinch roller 3a into pressure contact with capstan 4a and rotating shaft 17c into frictional engagement with rubber roller 10b of take-up reel base 10. Accordingly, the tape starts moving and recording commences. In the arrangement of the invention, playback lever 44 is pulled into engagement with third lock plate 76 by means of arm lever 40 during the recording operation.

FAST FORWARD OPERATION

Figure 25:
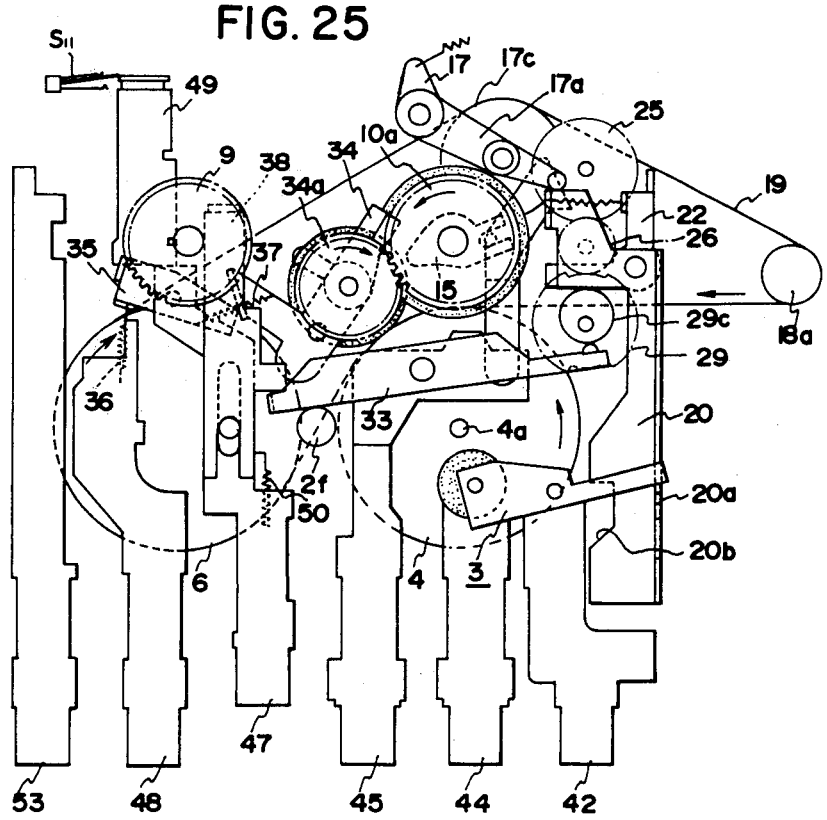
FIG. 25 is a plan view similar to FIG. 7 illustrating the pause operation during the playback state.

With cassette 8 loaded in head carriage 2, fast forward lever 47 is pushed (FIG. 25). Lock member 47a engages hook 74b of first lock plate 74. Since bent portion 47c of the lever is in engagement with suspending tab 35b, fast feed arm 35 is pivoted counterclockwise to press fast feed unit 34 at its lateral extension 34c. Then unit 34 is pivoted clockwise to bring its gear 34a in mesh with gear 10a of take-up reel base 10 and rubber roller 34b into frictional engagement with first fly-wheel 4. Further, advanced member 47a also shifts slide lever 77 to close switch S3 to energize motor 18. Accordingly, take-up reel base 10 is rotated in the forward direction at a high speed.

If stop lever 45 is pushed thereafter, second lock plate 75 and first lock plate 74 associated therewith are depressed. The engagement between fast forward lever 47 and first lock plate 74 is released, restoring the lever 47 to the rest position. Arm 35 and unit 34 associated with lever 47 are also restored to their rest positions. Gear 34a is disengaged from gear 10a and rubber roller 34a is separated from first fly-wheel 4. Slide lever 77 is also restored to open switch S3, resulting in the stop condition.

REWIND OPERATION

Figure 26:
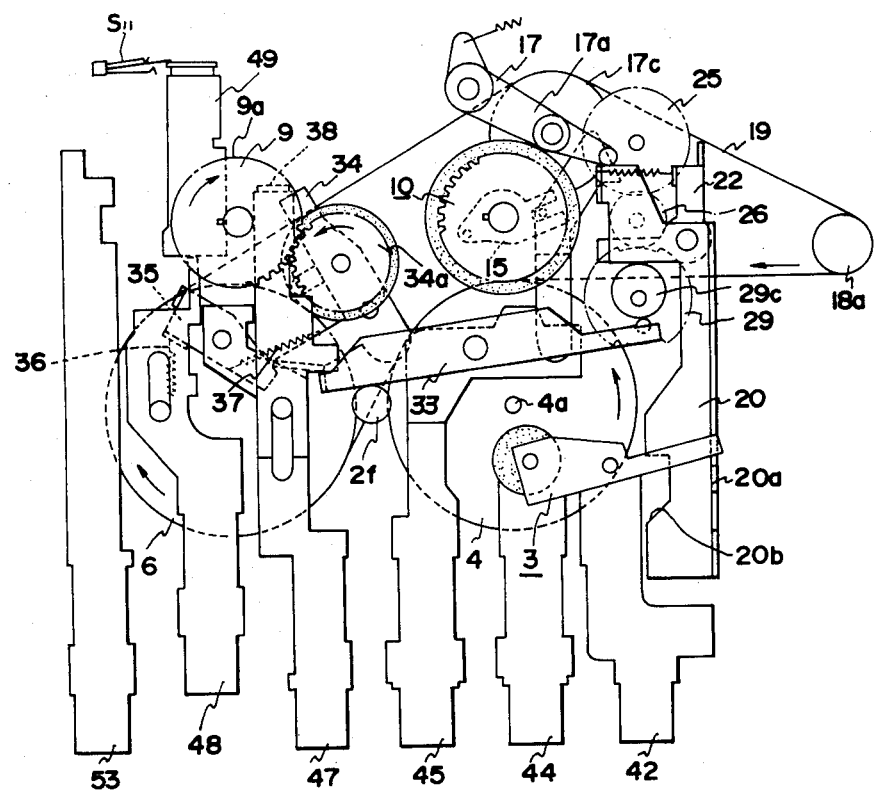
FIG. 26 is a plan view similar to FIG. 7 illustrating the rewind operation.

With cassette 8 loaded in head carriage 2, rewind lever 48 is pushed (FIG. 26). Lock member 48a engages hook 74b of first lock plate 74. Arm 35 is pivoted clockwise through the engagement of engaging tab 35a with edge 48c against biasing spring 36. Unit 34 is pulled by spring 37 and pivoted counterclockwise to bring gear 34a in mesh with gear 9a of supply reel base 9 and rubber roller 34b into frictional engagement with second fly-wheel 6. Further, advanced member 48a also shifts slide lever 77 to close switch $S_3$ to energize motor 18. Therefore, supply reel base 9 is rotated in the reverse direction at a high speed.

If stop lever 45 is pushed thereafter, second lock plate 75 first lock plate 74 associated therewith are depressed. The engagement between rewind lever 48 and first lock plate 74 is released, restoring lever 48 to the rest position. Arm 35 and unit 34 associated with lever 48 are also restored to their rest positions. Gear 34a is disengaged from gear 9a and rubber roller 34b is separated from second fly-wheel 6. Slide lever 77 is also restored to open switch $S_3$, resulting in the stop condition.

AUTO-STOP OPERATION DURING PLAYBACK OR RECORDING OPERATION

As described above, head carriage 2 is advanced to the playback recording position and take-up reel base 10 is rotating during the playback or recording operation. First and second arms 14 and 15 for detecting the end of tape supply are imparted with rotational force in the same direction as take-up reel base 10 is rotated (FIGS. 5 and 6). Auto-stop lever 32 with pin 32a engaged by first arm 14 is also imparted with rotational force in the same direction so that arched tab 32b at its one end is urged into engagement with the circumferential wall of eccentric circular recess 25a in first gear 25. Since first gear 25 meshes with second gear 26 which is driven by first fly-wheel 4 via belt 28, first gear 25 is rotating with tab 32b in pressure engagement with the circumferential wall of recess 25a. Tab 32b will not engage projection 25c in this condition.

It is not assumed that the tape is taken up completely and rotation of take-up reel base 10 is stopped. The biasing force to keep tab 32b in engagement with the circumferential wall of recess 25a is lost. Tab 32b passes the narrowest space $25a_1$ and then follows a circular path passing the middle point of the narrowest space. Since projection 25c is present in this path, tab 32b comes in engagement with projection 25c as first gear 25 rotates. Auto-stop lever 32 is pulled by means of rotating projection 25c to retract stop lever 45 connected to lever 32. Retraction of stop lever 45 gives the same result as when stop lever 45 is pushed. Thus the recorder is stopped through the same procedures as in the above-described case from playback operation to stop operation. After tab 32b is engaged with projection 25c, shoulder 32c of lever 32 is brought into engagement with release pin 25d on first gear 25 as first gear 25 rotates. The engagement between tab 32b and projection 25c is thus released, restoring stop lever 45 to the rest position.

AUTO-STOP OPERATION DURING FAST FORWARD OPERATION

As described above, head carriage 2 is in the intermediate position during the fast forward operation. Take-up reel base 10 is rotating at a high speed in the forward direction. Tab 32b is kept in engagement with the circumferential wall of eccentric circular recess 25a in first gear 25. After rotation of take-up reel base 10 is stopped, tab 32b is brought into engagement with projection 25c in the same manner as above. The subsequent procedures are the same as in the playback and recording operation and need not be described in detail.

It is to be noted that even when stop lever 45 is retracted to close switch $S_8$, switch $S_9$ is kept open due to the location of head carriage 2 in the intermediate position. Therefore solenoid 31 will not be energized during this operation.

AUTO-STOP OPERATION DURING REWIND OPERATION

As described above, head carriage 2 is in the intermediate position during the rewind operation. Take-up reel base 10 is rotating at a high speed in the reverse direction. Auto-stop lever 45 is imparted with rotational force in the reverse direction so that tab 32b is urged into engagement with the wall of cam plate 25b on first gear 25. In other words, first gear 25 rotates with its cam plate 25b forcibly engaged with tab 32b while take-up reel base 10 is rotating. After rotation of take-up reel base 10 is stopped, tab 32b passes the narrowest space $25a_1$ and then follows a circular path. Since projection 25c is present in this path, tab 32b comes in engagement with projection 25c as first gear 25 rotates. The subsequent procedures are the same as in the auto-stop operation during the fast forward operation and need not be described in detail.

PAUSE OPERATION DURING PLAYBACK OR RECORDING OPERATION

Figure 27:
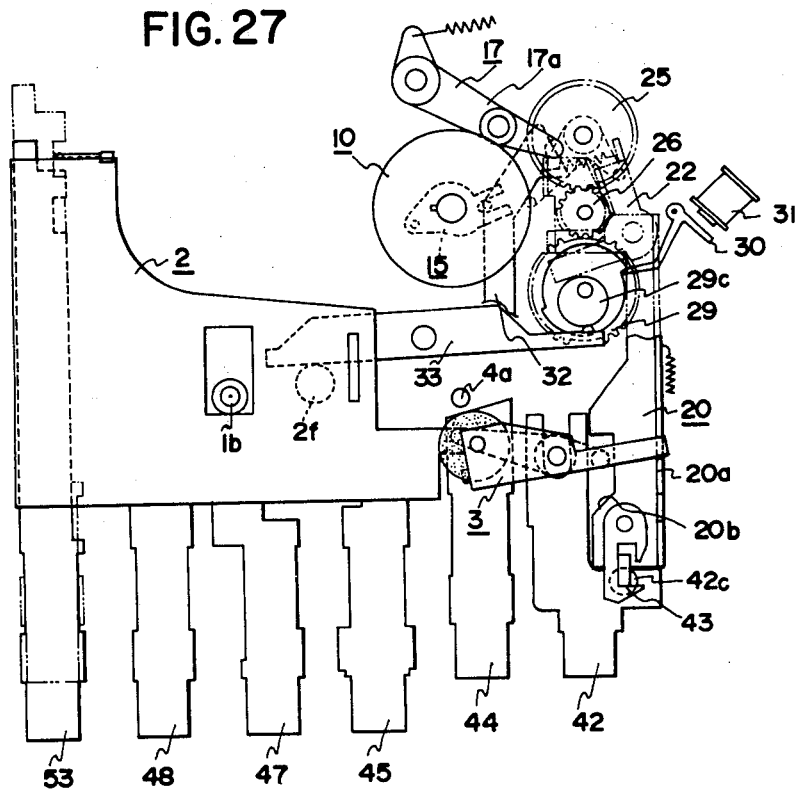
FIG. 27 is a plan view similar to FIG. 7 illustrating the fast forward operation.
Figure 28:
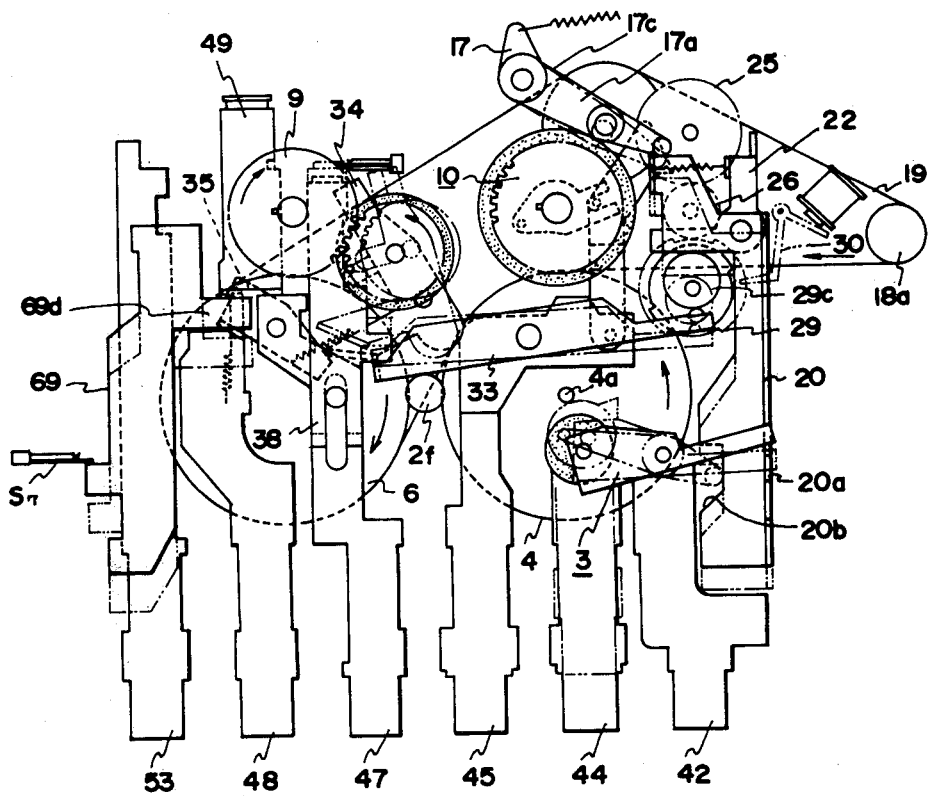
FIG. 28 is a plan view similar to FIG. 7 illustrating the auto-repeat operation.

As described above, head carriage 2 is in the playback/recording position and take-up reel base 10 is rotating in the forward direction during the playback or recording operation. Now, pause lever 42 is pushed (see FIG. 27). Lever 42 is locked by lock plate 43 through the engagement of stud 42c with the jaw of the lock plate. Set plate 20 is moved forward through the abutment of facing edges of lever 42 and plate 20 below lock plate 43, thereby pivoting take-up unit 17 via extreme edge 20c and stud 17d. As a result, rotating shaft 17c is moved apart from rubber roller 10b so that take-up reel base 10 stops rotating. This condition is the same as when the tape is stopped at its end during the playback or recording operation described above, except that actuating member 22 is pivotally rotated by means of biasing spring 23 to rotate control lever 24 about its pivot through the engagement of suspending wall 22a with the pin at the end of control lever 24. Consequently, auto-stop lever 32 engaged with control lever 24 is pivotally rotated in the same direction as in the playback or fast forward operation to urge tab 32b into engagement with the circumferential wall of eccentric circular recess 25a. Therefore, tab 35b is not engaged with projection 25c while first gear 25 is rotating. That is, the playback or recording state is not cancelled.

AUTO-STOP OPERATION DURING FAST FORWARD OR REWIND OPERATION

Head carriage 2 is in the intermediate position and take-up reel base 10 is rotating at a high speed during the fast forward or rewind operation. Even when pause lever 42 is pushed in this condition, no action is transmitted to set plate 20 and actuating member 22 because cam disc 29c at the largest lobe is engaged with them.

Therefore, actuating member 22 applies no external force to auto-stop lever 32. Auto-stop operation is conducted in the same manner as in the above-described cases independent of the pause lever after the tape is taken up or rewound to its end.

QUE OPERATION

To provide que operation, fast forward lever 47 is pushed during the playback operation. Then, fast feed unit 34 is pivotally rotated via fast feed arm 35 to bring gear 34a into mesh with gear 10a of take-up reel base 10 and rubber roller 34b into frictional engagement with first flywheel 4. Pushing of fast forward lever 47 closes switch $S_9$ via slide lever 38 and switch $S_{11}$ via sublever 49 to energize solenoid 31. This allows cam disc 29c to be rotated, thereby pivotally moving play arm 33 to return head carriage 2 to the intermediate position, disengaging pinch roller 3a from capstan 4a, and disengaging rotating shaft 17c from rubber roller 10a of take-up reel base 10. This take-up reel base 10 is rotated at a high speed, via fast feed unit 34 resulting in the fast forward state. Though first lock plate 74 is depressed, third lock plate 76 is not depressed. Thus playback lever 44 is maintained locked by third lock plate 76. It should be noted that playback lever 44 is not returned because lever arm 40 is not pivotally rotated by means of set plate 20.

If fast forward lever 47 is left free or returned thereafter, fast feed arm 35 and unit 34 are restored to disengage gear 34a from gear 10a of take-up reel base 10 and disengage rubber roller 34b from first fly-wheel 4, thereby cancelling the fast forward state. Return of fast forward lever 47 also causes slide lever 38 and sub-lever 49 to be returned to close switches $S_6$ and $S_4$ (whereas switch $S_5$ is closed due to the depression of second lock plate 75 and switch $S_3$ is closed due to the shifting of slide lever 77), thereby energizing solenoid 31. Thus, cam disc 29c is rotated, thereby pivotally moving play arm 33 to move head carriage 2 to the recording/playback position, and moving set plate 20 so as to bring pinch roller 3a into pressure contact with capstan 4a and rotating shaft 17c into frictional engagement with rubber roller 10a of take-up reel base 10. Thus, the playback state is recovered.

REVIEW OPERATION

To provide review operaton, rewind lever 48 is pushed during the playback operation. Fast feed arm 35 is then pivoted so as to pull fast feed unit 34 via spring 37. At this point, tongue 34d of unit 34 abuts step 38c of slide lever 38, thereby preventing gear 34a from being meshed with gear 9a of supply reel base 9. That is, the tape is prevented from moving in the reverse direction prior to the cancellation of the playback state. Pushing of rewind lever 48 closes switch $S_{11}$ via sub-lever 49 (whereas switch $S_9$ is closed by slide lever 38) to energize solenoid 31. As in the above-described que operation, head carriage 2 is thus returned to the intermediate position, pinch roller 3a is disengaged from capstan 4a, and rotating shaft 17c is disengaged from rubber roller 10a of take-up reel base 10. Play arm 33 is pivoted so as to release tongue 34d of fast feed unit 34 from step 38c of slide lever 38. Fast feed unit 34 is further pivoted to bring gear 34a in mesh with gear 9a of supply reel base 9 and rubber roller 34b in pressure engagement with second fly-wheel 6, resulting in the rewind state.

If rewind lever 48 is left free or returned thereafter, fast feed arm 35 and unit 34 are restored to disengage gear 34a from gear 10a of supply reel base 9 and rubber roller 34b from second fly-wheel 6, thereby cancelling the rewind state. Then, the playback state is recovered according to the same procedures as in the above-described que operation.

QUICK REVIEW

To provide quick review operation, rewind lever 48 is pushed during the recording operation. Lock member 48a moves down first lock plate 74 to disengage record lever 53 from first lock plate 74, thereby interrupting the recording circuit. At this point, however, playback lever 44 is maintained locked as in the above-described que and review operations. Since second lock plate 75 is depressed by playback lever 44, lock member 48a of rewind lever 48 is not engaged by first lock plate 74. It is to be noted that, fast forward lever 47 and rewind lever 48 are not locked by first lock plate 74 in the above-described que and review operations for the same reason.

Depression of rewind lever 48 results in the rewind state as in the above-described review operation. Release of rewind lever 48 results in the playback state again. Therefore, the portion of the tape which has just been recorded can be soon played back only by depressing rewind lever 48.

AUTO-REPEAT OPERATION

To provide the auto-repeat operation, auto-repeat lever 66 is turned and locked when the recorder is turned on, but is not subjected to any operation. Then switch $S_7$ is closed to actuate motor 18. Turning of auto-repeat lever 66 causes repeat slide lever 69 to move forward so that engaging portion 69d presses fast feed arm 35 at its upstanding tab 35a. Fast feed arm 35 is pivoted and fast feed unit 34 is thus pivoted via spring 37 to bring gear 34a in mesh with gear 9a of supply reel base 9 and rubber roller 34b into pressure engagement with second fly-wheel 6, resulting in the rewind state.

Thereafter take-up reel base 10 is stopped when the tape is rewound to its end. Stop lever 45 is pulled through the above-described auto-stop operation. Switch $S_7$ is closed and head carriage 2 is in the intermediate position at this point. In addition, switches $S_4$ and $S_6$ are closed and switch $S_5$ is closed when the pushing of stop lever 45 causes second lock plate 75 to be depressed. Solenoid 31 is thus energized. Play arm 33 is pivoted to allow head carriage 2 to move forward to the recording playback position. Set plate 20 is moved so as to bring pinch roller 3a in pressure contact with capstan 4a and rotating shaft 17c into engagement with rubber roller 10a of take-up reel base 10. Pivotal movement of play arm 33 also causes slide lever 38 to move forward so that its step 38c engages fast feed unit 34 at its tongue 34d to pivotally move fast feed unit 34 a small angle, thereby releasing gear 34a from gear 9a of supply reel base 9 and disengaging rubber roller 34b from second fly-wheel 6. The playback condition is thus established. It should be noted that this playback operation is observable because movement of set plate 20 causes lever arm 40 to be pivoted so as to pull playback lever 44, which is locked by third lock plate 76.

When take-up reel base 10 is stopped in accordance with the termination of the playback operation, the auto-stop operation commences as described above. Play arm 33 is pivotally moved to move slide lever 38 forward releasing step 38c from tongue 34d of fast feed unit 34. Then fast feed unit 34 is pivotally moved to bring gear 34a in mesh with gear 9a of supply reel base 9 and rubber roller 34b in pressure contact with second fly-wheel 6, resulting in the rewind operation. Thereafter, the playback operation is initiated as soon as the rewind operation is terminated as described above. The auto-repeat operation is thus established.

AUTO-REPEAT OPERATION DURING RECORDING OPERATION

Auto-repeat lever 66 is pushed and locked during the recording operation. As in the above-described playback operation, the recording operation is continued with rewinding. When take-up reel base 10 is stopped in accordance with the termination of recording, the auto-stop operation is conducted to release record lever 53 and at the same time initiate the rewind operation. The playback operation again commences after the rewinding is finished as in the auto-repeat operation during the playback state.

RANDOM AUTO-REPEAT OPERATION

If the playback operation is conducted with auto-repeat lever 66 locked, the auto-stop operation commences upon termination of the playback operation, inducing the rewind operation. If it is desired to conduct the rewind operation before the playback operation reaches the end, stop lever 45 must be pushed. The switch $S_8$ is closed (switch $S_7$ is closed due to locking of auto-repeat lever 66) and switch $S_9$ is closed due to the location of play arm 33 in the clockwise turned position and slide lever 38 in the advanced position to energize solenoid 31. As a result, play arm 33 is pivoted counter clockwise, causing head carriage 2 to move to its intermediate position and set plate 20 to move forward to release pinch roller 3a from capstan 4a and rotating shaft 17c from take-up reel base 10. Pivotal movement of playback arm 33 also causes slide lever 38 to move backward to leave fast feed unit 34 free so that unit 34 is pivotally moved to bring gear 43a in mesh with gear 9a of supply reel base 9 and rubber roller 34b into frictional engagement with second fly-wheel 6. The rewind operation is thus established.

In order to change the recorder from the rewind state to the playback state, stop lever 45 is again pressed to close switch $S_5$. Since switches $S_4$ and $S_6$ are closed due to the location of head carriage 2 in the intermediate position and switch $S_7$ is closed due to locking of auto-repeat lever 66, solenoid 31 is energized. The subsequent procedures are the same as in the above-described conversion process from rewind to playback state via auto-stop action in auto repeat fashion and need not be described further.

FAST FORWARD OPERATION DURING AUTO REPEAT OPERATION

If fast forward lever 47 is pushed in order to provide the fast forward operation, during the playback operation with auto-repeat lever 66 locked, lock member 47a is engaged by hook 74b of first lock plate 74. Depression of fast forward lever 47 causes slide lever 38 to move forward to close switch $S_9$ and also causes sub-lever 49 to move forward to close switch $S_{11}$, thereby energizing solenoid 31. In the same manner as when stop lever 45 is pushed during the playback operation to induce auto-repeat operation, head carriage 2 is moved to the intermediate position, pinch roller 3a is released from capstan 4a, and rotating shaft 17c is released from take-up reel base 10. With fast forward lever 47 pushed, arm 35 is pivoted counter clockwise to press lateral extension 34c of unit 34, which is pivotally moved to bring gear 34a in mesh with gear 10a of supply reel base 10 and rubber roller 34b into frictional engagement with first fly-wheel 4. The fast forward operation is thus established.

If stop lever 45 is pushed during this fast foward operation, then the operation is changed into the playback operation in the same manner as in the conversion process from rewind to playback state in the random auto repeat fashion.

INTERVAL DETECTION OPERATION

Interval detecting lever 56 (FIG. 12) is pushed. Its lower arm 56b urges upward control member 59 which is rotated counterclockwise in FIG. 19 against biasing coil spring 60 (FIG. 11). Since lateral tab 56a is displaced, lock plate 57 is rotated clockwise by means of spring 58. Jaw 57a is abutted to control member 59 at its side and then brought into biting engagement with control member 59 at its bottom with the aid of biasing spring 58 because the one end of rotated control member 59 is moved beyond the upper edge of jaw 57a. Pushing lever 56 also closes switch Ps.

Then playback lever 44 is pressed. The playback operation is provided and the tape starts running. Since third lock plate 76 is depressed by control member 59, playback lever 44 is not locked, but maintained in retracted or actuating position by means of lever arm 40 only. If rewind lever 48, for example, is pushed during this playback operation, lever 48 is locked by first lock plate 74, the operation changes from the playback to the rewind operation. Since interval detecting lever 56 and rewind lever 48 are actuated, interval detecting circuit MS is ON. When the circuit detects the interval (no signal duration) between musical tunes in the tape, lever arm 40 retracts playback lever 44 to raise second lock plate 75, thereby releasing rewind lever 48 which has been locked by first lock plate 74. The recorder assumes the playback operation to play back the desired recorded portion of the tape. The fast forward operation can be attained in a similar manner by pushing fast forward lever 47 in place of rewind lever 48.

TIMER ACTUATION OF RECORDING OPERATION

It is assumed that power switch $S_1$ is closed and record lever 53 is locked. Timer switch $S_2$ is closed in this condition. Since switch $S_3$ is closed due to shifting of slide lever 77, switch $S_{10}$ is closed due to depression of record lever 53, and switches $S_4$ and $S_6$ are closed due to location of head carriage 2 in the intermediate position, recording is started in the same manner as in the above-described recording operation. When the tape reaches its end, the recorder is stopped by means of the auto-stop mechanism.

TIMER ACTUATION OF PLAYBACK OPERATION

It is assumed that power switch $S_1$ is closed and playback lever 44 is locked. Timer switch $S_2$ is closed in this condition. Since switch $S_3$ is closed due to shifting of slide lever 77, switch $S_5$ is closed due to depression of second lock plate 75 by playback lever 44, and switches $S_4$ and $S_6$ are closed due to location of head carriage 2 in the intermediate position, the playback operation is started in the same manner as in the above-described playback operation. When the tape comes to its end, the recorder is stopped by means of the auto-stop mechanism.

REMOTE CONTROL OPERATION

Remote control switch $S_{12}$ (whose actual location is not shown in the drawings) is closed. Then motor 18 is energized to rotate second gear 26 and first gear 25. Since the recorder is in neither recording, playback, fast forward nor rewind state, neither supply reel base 9 nor take-up reel base 10 rotates and thus the auto-stop operation is initiated.

In order to provide the remote control operation, interval detecting lever 56 is previously locked to depress third lock plate 76. Stop lever 45 is pulled through the auto-stop operation to close switch $S_5$. Since switches $S_4$ and $S_6$ are closed due to location of head carriage 2 in the intermediate position, solenoid 31 is thus energized. Play arm 33 is pivotally rotated to allow head carriage 2 to move forward to the recording/playback position and set plate 20 is moved backward to bring pinch roller 3a into pressure contact with capstan 4a and rotating shaft 17c in pressure contact with rubber roller 10b of take-up reel base 10. The playback operation is established and playback lever 44 is retracted via lever arm 40. Since third lock plate 76 is depressed by interval detecting lever 56 at this point, lock member 44a' is not engaged by third lock plate 76. Therefore, playback lever 44 is maintained retracted only by means of arm lever 40.

Thereafter, remote control switch $S_{13}$ is closed. Even when remote control switch $S_{12}$ is opened, $S_3$ is maintained closed because the playback state continues. Solenoid 31 is thus energized and head carriage 2 is returned to the intermediate position, pinch roller 3a is released from capstan 4a, and rotating shaft 17c is released from rubber roller 10b. Playback lever 44 is restored to the rest position via arm lever 40. If remote control switch $S_{12}$ is again closed, the playback state is recovered according to the above-described procedures.

MEMORY OPERATION

Memory switch $S_{14}$ (whose actual location is not shown in the drawings) is closed and counter 11 is set to zero. By pushing and locking playback lever 44, the playback operation is initiated. If it is desired to playback again the portion which has just been played stop lever 45 is pushed to provide a stop state according to the above-described procedures. Then rewind lever 48 is pushed and locked to rewind the tape according to the above-described rewind procedures. When reversed counter 11 reaches the count "999", counter switch $S_{15}$ is closed. Since switch $S_3$ is closed due to shifting of slide lever 77 and switch $S_6$ is closed due to location of head carriage 2 in the intermediate position, solenoid 31 is energized. Play arm 33 is pivotally rotated to allow head carriage 2 to move forward to the recording/playback position and set plate 20 is moved backward to bring pinch roller 3a into pressure contact with capstan 4a and rotating shaft 17c into pressure contact with rubber roller 10b of take-up reel base 10. Thus the playback condition is established. Play lever 44 is pulled and locked by means of lever arm 40, whereas rewind lever 48 is released.

EJECT OPERATION DURING ROTATION OF TAKE-UP REEL BASE

Under the condition that take-up reel base 10 is rotated by the driving force of the motor during the recording, playback or fast forward operation, eject lever 60 is pulled. Then, head carriage 2 is returned to the rest position and cassette 8 is sprung out of reel bases 9 and 10. Since take-up reel base 10 still continues rotating due to the driving force of the motor in this condition, the recorder continues its operation.

Figure 16:
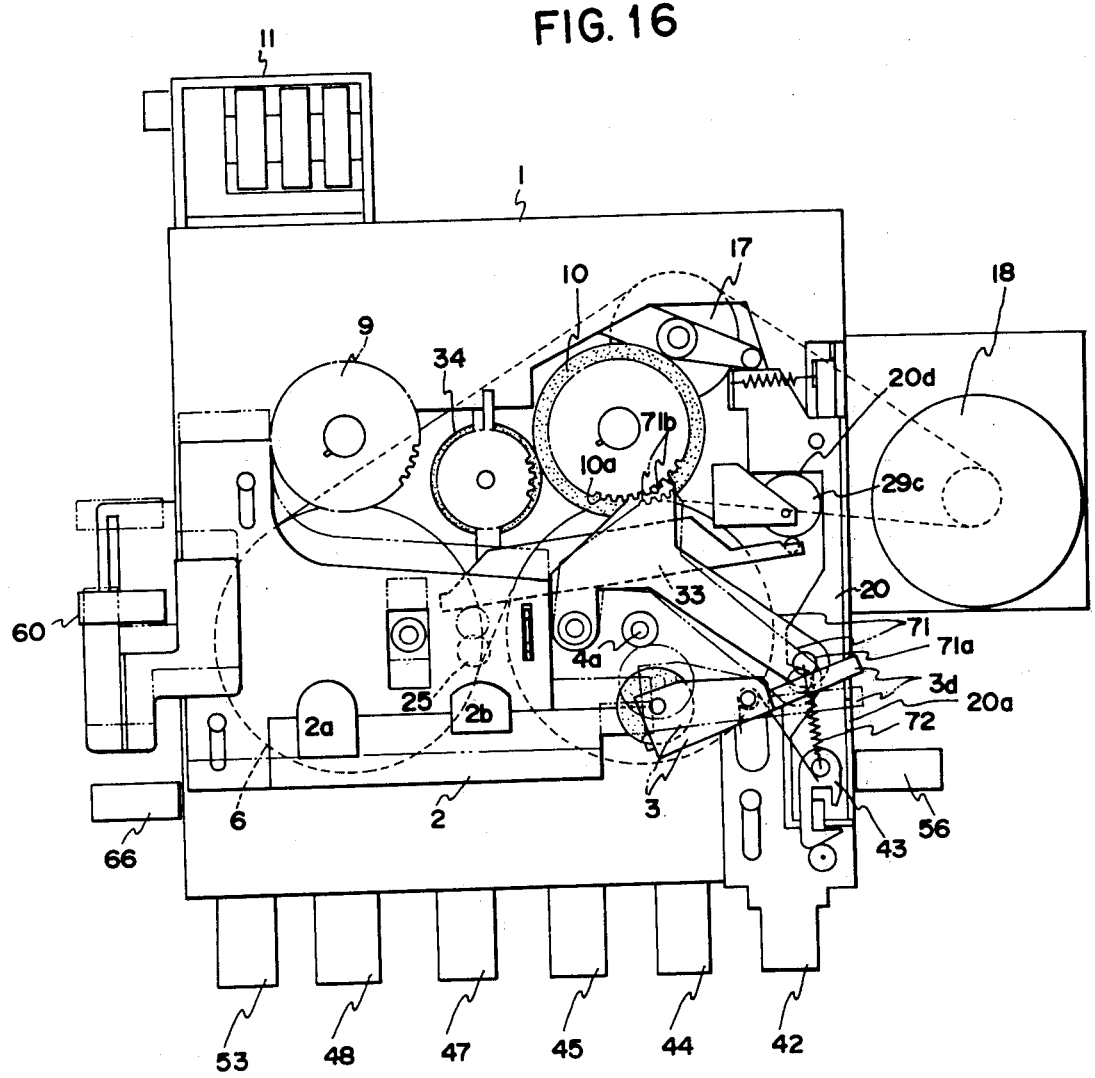
FIG. 16 is a plan view illustrating an example of reel base braking mechanism.

If eject lever 60 is pulled as shown in FIGS. 16 to 18, then take-up reel base 10 is forcibly stopped and the recorder is stopped according to the above-described automatic stop operation. Take-up reel base 10 may be stopped by returning pinch roller unit 3 as in FIG. 16, by retracting head carriage 2 as in FIG. 17, or by removing cassette 8 as in FIG. 18.

REMOTE CONTROL OPERATION DURING AUTO-REPEAT OPERATION

The remote control operation is not available unless interval detecting lever 56 is locked.

Now auto-repeat lever 66 is locked as well as interval detecting lever 56. Since remote control switch $S_{13}$ is connected in parallel with a circuit of switches $S_4$, $S_5$ and $S_6$ and with a circuit of switches $S_8$ and $S_9$ as apparent from the circuit diagram of FIG. 22, solenoid 31 is energized each time remote control switch $S_{13}$ is closed. Therefore, the above-described random auto-repeat operation can be performed via a remote control unit (not shown).

What is claimed is:

1. A cassette tape recorder which includes playback and stop means mounted on a chassis for controlling the function of the recorder, the improvement which comprises: a head carriage having at least a playback head, said carriage being slidably mounted on said chassis and shiftable between an operating position and another position, cam disc means for shifting said head carriage between said operating and another position, said cam disc means being operably connected to said carriage and with means for causing it to rotate one half turn thereby causing said shift in the carriage, said means for rotating the cam disc means being connected with and activated by playback and stop means, whereby activation of said playback or stop means causes said carriage to shift between the operating and another position.

2. A recorder according to claim 1 wherein said head carriage is shifted from a rest position to the other position when a cassette is loaded.

3. A recorder according to any one of claims 1 and 2 which further comprises
   a set plate slidably mounted on the chassis and adapted to be reciprocated for every half turn of the cam disc, and
   a pinch roller unit and a take-up unit, both units being engaged by said set plate,
   wherein for every half turn of the cam disc, the set plate controls the pinch roller unit and take-up unit so that the pinch roller and take-up units are brought into and out of engagement with a capstan and a take-up reel base, respectively.

4. A recorder according to any one of claims 1 and 2 which further comprises a take-up unit for rotating a take-up reel base when both are engaged with each other, said take-up unit being operatively connected to the cam disc so that the take-up unit is brought into or out of engagement with the take-up reel base at the same time as when the head carriage is shifted between the other and the recording/playback positions for every half turn of the cam disc.

5. A recorder according to claim 4 which further comprises a pinch roller unit having a pinch roller, said unit being operatively connected to the cam disc so that the pinch roller is brought into pressure contact with or moved apart from a capstan for every half turn of the cam disc.

6. A recorder according to claim 1 wherein said cam disc is also adapted to be rotated a half turn each time a record lever is actuated.

7. A recorder according to claim 6 which further comprises means for operatively connecting said cam disc and the playback lever so that when the record lever is actuated, the playback lever is also actuated via said cam disc and operative connecting means.

8. A recorder according to claim 1 which further comprises
- a pinch roller unit operatively connected to said cam disc for controlling a pinch roller relative to a capstan between contact and non-contact positions in response to rotation of the cam disc, and
- a take-up unit operatively connected to the cam disc for controlling rotation of a take-up reel base in response to rotation of the cam disc,
- wherein the playback lever is moved to the playback position at the same time as the pinch roller unit is brought into pressure contact with a capstan and the take-up unit is brought into engagement with a take-up reel base in response to rotation of the cam disc.

9. A recorder according to claim 8 which further comprises a set plate adapted to be reciprocated for every half turn of said cam disc for controlling the operative connection of the cam disc with the pinch roller and take-up units.

10. A recorder according to claim 8 which further comprises
- a motor,
- one gear driven by the motor,
- another gear located so as to mesh with said one gear, having diametrically opposite uncut portions at its circumference and provided with a toothed cam plate and said eccentric cam disc, said integral third gear, toothed cam plate and cam disc being rotated a half turn each time any one of the levers is pushed,
- a solenoid adapted to be electrically switched by any one of said levers,
- a lock arm associated with said solenoid and normally locking the toothed cam plate,
- a set plate contacting the cam disc and reciprocal in response to every half turn of the cam disc,
- said pinch roller and take-up units being engaged with the set plate so as to bring the pinch roller into pressure contact with the capstan and the take-up unit into engagement with the take-up reel base when the set plate is in contact with the smallest lobe of the cam disc,
- a play arm contacting the cam disc at the point diametrically opposite to the contact point of the set plate for imparting a rotational force in one direction to the cam disc when one uncut portion of the other gear faces the one gear, and
- means associated with the set plate for imparting a rotational force in the opposite direction to the cam disc when the opposite uncut portion faces the one gear, said rotational forces alternately causing the cam disc to rotate a small angle to bring the other gear in mesh with the one gear after said lock arm is released from said toothed cam plate.

11. A cassette tape recorder including playback and record levers and a drive motor on a chassis, which comprises
- a first gear driven by the motor,
- a second gear located so as to mesh with said first gear, said second gear having diametrically opposite uncut portions at its circumference and provided with a toothed cam plate and an eccentric cam disc,
- a solenoid adapted to be electrically switched by the playback and record levers,
- a lock arm associated with said solenoid and normally locking the toothed cam plate,
- means associated with said cam disc for biasing it in one direction,
- a head carriage shiftable between a recording/playback position and another position, and
- means for operatively connecting said cam disc and head carriage,
- wherein when the playback or record lever is pushed, said solenoid is energized to displace the lock arm to disengage it from the toothed cam plate, said biasing force acts on the cam disc to rotate said second gear and to bring the second gear in mesh with the first gear, so that the second gear is rotated a half turn, thereby shifting the head carriage to the recording/playback position through the operative connecting means.

12. A recorder according to claim 11 which further comprises
- means associated with said cam disc for biasing it in the opposite direction, said biasing means and opposite biasing means being actuated when they are in contact with the largest lobe of said eccentric cam disc,
- whereby the biasing force in the opposite direction acts on the cam disc to rotate a small angle the other gear whose opposite uncut portion has faced the one gear, thereby shifting the head carriage from the recording/playback position to the other position.

13. A recorder according to claim 12 wherein
- said head carriage is shifted from a rest position to the other position when a cassette is loaded, and
- said operative connecting means includes a play arm having one end engaging said eccentric cam disc and the other end engaging said head carriage, said play arm being biased in the opposite direction at its one end when it is in contact with the largest lobe of the cam disc,
- whereby the play arm causes the head carriage to shift to the recording/playback and to the other position when the one end of the play arm engages the largest and the smallest lobe of the cam disc, respectively.

14. A recorder according to claim 13 which further comprises
- a set plate which contacts said cam disc at the point diametrically opposite to the contact point of the play arm, said set plate being biased in one direction,
- a pinch roller unit engaged by the set plate and having a pinch roller, and a take-up unit movable in correspondence with the set plate and having a rotating shaft driven by the motor, wherein said pinch roller is brought into pressure contact with a capstan and said rotating shaft is brought into engagement with a take-up reel base when the set plate is in contact with the smallest lobe of the cam disc.

15. A recorder according to claim 14 which further comprises a lever arm pivotally mounted to the chassis and having one end pivotally connected to the playback lever and the other end engaged by the set plate, wherein said lever arm is pivotally turned so as to pull the playback lever into the playback position when the set plate is in contact with the smallest lobe of the cam disc.

* * * * *

UNITED STATES PATENT AND TRADEMARK OFFICE
CERTIFICATE OF CORRECTION

PATENT NO. : 4,219,852
DATED : August 26, 1980
INVENTOR(S) : MAGATA ET AL

It is certified that error appears in the above-identified patent and that said Letters Patent are hereby corrected as shown below:

Page 1; line 8, after "[21]" correct Serial Number "954,881" to --954-884--.

Signed and Sealed this

Twenty-seventh Day of January 1981

[SEAL]

Attest:

RENE D. TEGTMEYER

Attesting Officer

Acting Commissioner of Patents and Trademarks